US008892630B1

(12) United States Patent
Curtis

(10) Patent No.: US 8,892,630 B1
(45) Date of Patent: Nov. 18, 2014

(54) FACILITATING DISCUSSION GROUP FORMATION AND INTERACTION

(75) Inventor: Michael G. Curtis, Sammamish, WA (US)

(73) Assignee: Amazon Technologies, Inc., Seattle, WA (US)

( * ) Notice: Subject to any disclaimer, the term of this patent is extended or adjusted under 35 U.S.C. 154(b) by 139 days.

(21) Appl. No.: 12/240,842

(22) Filed: Sep. 29, 2008

(51) Int. Cl.
*G06F 15/16* (2006.01)

(52) U.S. Cl.
USPC ............................ 709/203; 709/206; 709/224

(58) Field of Classification Search
CPC .............................. H04L 67/306; H04L 67/42
USPC .......... 709/203, 204–206, 223–224, 217–219
See application file for complete search history.

(56) References Cited

U.S. PATENT DOCUMENTS

| | | | |
|---|---|---|---|
| 5,337,407 A | 8/1994 | Bates et al. | |
| 5,764,345 A | 6/1998 | Fladd et al. | |
| 5,960,173 A | 9/1999 | Tang et al. | |
| 6,714,791 B2 | 3/2004 | Friedman | |
| 7,076,546 B1 | 7/2006 | Bates et al. | |
| 7,107,533 B2 | 9/2006 | Duncan et al. | |
| 7,246,118 B2 * | 7/2007 | Chastain et al. | 707/999.007 |
| 7,257,769 B2 | 8/2007 | Caspi | |
| 7,350,704 B2 * | 4/2008 | Barsness et al. | 235/435 |
| 7,418,656 B1 | 8/2008 | Petersen | |
| 7,512,653 B2 | 3/2009 | Krishnasamy et al. | |
| 7,543,213 B2 | 6/2009 | Lin | |
| 7,543,237 B2 | 6/2009 | Kontny et al. | |
| 7,669,213 B1 | 2/2010 | Wick et al. | |
| 7,716,349 B1 * | 5/2010 | Hendricks | 709/229 |
| 7,779,347 B2 | 8/2010 | Christiansen et al. | |
| 7,921,309 B1 | 4/2011 | Isbister et al. | |
| 8,261,182 B1 | 9/2012 | Petersen | |
| 8,436,911 B2 | 5/2013 | Leebow | |
| 2001/0007980 A1 * | 7/2001 | Ishibashi et al. | 709/203 |
| 2002/0035697 A1 | 3/2002 | McCurdy et al. | |
| 2002/0107759 A1 * | 8/2002 | An | 705/26 |
| 2002/0120635 A1 | 8/2002 | Joao | |
| 2002/0152215 A1 * | 10/2002 | Clark et al. | 707/10 |
| 2002/0178163 A1 | 11/2002 | Mayer | |
| 2003/0084404 A1 | 5/2003 | Dweck et al. | |
| 2004/0008970 A1 | 1/2004 | Junkersfeld et al. | |
| 2004/0098275 A1 * | 5/2004 | Hubert | 705/1 |
| 2004/0098280 A1 | 5/2004 | Hubert | |
| 2004/0261016 A1 | 12/2004 | Glass et al. | |
| 2005/0108556 A1 * | 5/2005 | DeMello et al. | 713/189 |
| 2005/0132281 A1 | 6/2005 | Pan et al. | |
| 2005/0193330 A1 | 9/2005 | Peters | |

(Continued)

OTHER PUBLICATIONS

"African American Literature Book Club", retrieved from: http://www.aalbc.com/ on Jan. 30, 2009, 4 pages.

(Continued)

*Primary Examiner* — Philip B Tran
(74) *Attorney, Agent, or Firm* — Lee & Hayes, PLLC

(57) ABSTRACT

Facilitating discussion group formation and interaction is described. In one example, a server sends an eBook to a client device. The server determines whether the eBook is associated with at least one book club in response to sending the eBook to the client device. The server sends book club identifiers to the client device when the eBook is associated with at least one book club. The book club identifiers specify one or more book clubs associated with the eBook.

20 Claims, 11 Drawing Sheets

(56) References Cited

U.S. PATENT DOCUMENTS

| | | | |
|---|---|---|---|
| 2006/0071754 | A1 | 4/2006 | Tofts et al. |
| 2006/0075205 | A1 | 4/2006 | Martin et al. |
| 2006/0085735 | A1 | 4/2006 | Shimizu |
| 2006/0098900 | A1 | 5/2006 | King et al. |
| 2006/0161578 | A1 | 7/2006 | Siegel et al. |
| 2007/0055926 | A1 | 3/2007 | Christiansen et al. |
| 2007/0078965 | A1 | 4/2007 | Shimamura et al. |
| 2008/0092181 | A1 | 4/2008 | Britt |
| 2008/0098294 | A1 | 4/2008 | Le |
| 2008/0154908 | A1 | 6/2008 | Datar et al. |
| 2008/0168073 | A1 | 7/2008 | Seigel et al. |
| 2008/0195657 | A1 | 8/2008 | Naaman et al. |
| 2008/0201632 | A1 | 8/2008 | Hong et al. |
| 2008/0222295 | A1 | 9/2008 | Robinson et al. |
| 2008/0227074 | A1* | 9/2008 | Johnson .................. 434/307 R |
| 2009/0005990 | A1 | 1/2009 | Anderson et al. |
| 2009/0157522 | A1 | 6/2009 | Srinivasan et al. |
| 2009/0204882 | A1 | 8/2009 | Hollander et al. |
| 2009/0210244 | A1 | 8/2009 | Koister et al. |
| 2009/0271381 | A1 | 10/2009 | Beezer et al. |
| 2009/0287714 | A1 | 11/2009 | Vasudevan et al. |
| 2010/0057714 | A1 | 3/2010 | Miedema |
| 2010/0070845 | A1 | 3/2010 | Facemire et al. |
| 2010/0205105 | A1 | 8/2010 | Robertson et al. |
| 2010/0278453 | A1 | 11/2010 | King |
| 2011/0087955 | A1 | 4/2011 | Ho et al. |
| 2011/0173141 | A1 | 7/2011 | Campbell et al. |
| 2011/0196863 | A1 | 8/2011 | Marcucci et al. |
| 2011/0225192 | A1 | 9/2011 | Imig et al. |
| 2011/0282866 | A1 | 11/2011 | Erickson et al. |
| 2012/0036423 | A1 | 2/2012 | Haynes, II et al. |
| 2012/0084634 | A1 | 4/2012 | Wong et al. |
| 2012/0150859 | A1 | 6/2012 | Hu |
| 2012/0221938 | A1 | 8/2012 | Patterson et al. |
| 2012/0254304 | A1 | 10/2012 | Anbalagan et al. |
| 2013/0021281 | A1 | 1/2013 | Tse et al. |
| 2013/0104028 | A1 | 4/2013 | Murray et al. |
| 2013/0166471 | A1 | 6/2013 | Fukuda Kelley et al. |

OTHER PUBLICATIONS

"Book Clubs Barnes and Noble", retrieved from: http://www.barnesandnoble.com/bookclubs/ on Jan. 30, 2009, 1 page.

"Borders Book Club Resources", retrieved from: http://www.bordersmedia.com/bookclubs/default.asp on Jan. 30, 2009, 3 pages.

"Book clubs on and offline", retrieved from: http://www.chistell.com/book_clubs.htm on Jan. 30, 2009. 3 pages.

"General Interest Online Book Clubs and Web-based Book Discussion", retrieved from: http://www.book-clubs-resource.com/online/general.php on Jan. 30, 2009, 3 pages.

"Internet Book Clubs and Discussion Groups", retrieved from: http://www.monroe.lib.in.us/fiction/inbookclubs.html on Jan. 30, 2009, 1 page.

"Oprah's Book Club", retrieved from: http://www.oprah.com/entity/oprahsbookclub on Jan. 30, 2009, 1 page.

"Reader's Circle Author chats", retrieved from: http://www.randomhouse.com/rhpg/rc/author_chats/index.html on Jan. 30, 2009, 1 page.

"Reader's Paradise Forum-Garden Web", retrieved from: http://glyphs.gardenweb.com/forums/paradise/ on Jan. 30, 2009, 1 page.

"Salon Table Talk—Books ", retreived from: http://tabletalk.salon.com/webx?13@114.sxcAajHRfod.0@.ee6ced0 on Jan. 30, 2009, 4 pages.

International Search Report, Application No. PCT/US/08/57829, filed Mar. 21, 2008, 2 pages.

SeniorNet—SeniorNet Books & Literature, retreived from: http://www.seniornet.org/jsnet/index.php?option=com_content&task=view&id=363&Itemid=37 on Jan. 30, 2009, 2 pages.

"ShakespeareHigh.com" Billy's book club, retrieved from: http://www.shakespearehigh.com/cafeteria/index.php?PHPSESSID=a5d84904c94dbba0197c4724a1344c91&board=57.0 on Jan. 30, 2009, 1 page.

"The Bookies: An online book discussion group", retrieved from: http://www.geocities.com/bookiestoo/ on Jan. 30, 2009, 1 page.

"Vintage Reading Group Center", retrieved from: http://www.randomhouse.com/vintage/read/rgg.html on Jan. 30, 2009, 1 page.

"Yahoo! Groups: Directory : Reading Groups", retrieved from : http://dir.groups.yahoo.com/dir/Entertainment__Arts/Humanities/Books__and__Writing/Reading__Groups on Jan. 30, 2009, 2 pages.

Fish et al., "Quilt: a collaborative tool for cooperative writing", 1998, ACM, pp#30-pp#37.

U.S. Appl. No. 12/260,764 , filed Oct. 29, 2008, Smith et al., "Organizing Collaborative Annotations".

Final Office action for U.S. Appl. No. 12/260,764, mailed on Jan. 19, 2012, Smith et al., "Organizing Collaborative Annotations", 23 pages.

Non-Final Office Action for U.S. Appl. No. 12/260,713, mailed on Feb. 23, 2011, Brent Russell Smith et al, "Providing Presence Information Within Digital Items", 15 pages.

Final Office Action for U.S. Appl. No. 12/260,713, mailed on Jul. 3, 2012, Brent Russell Smith et al, "Providing Presence Information Within Digital Items", 19 pages.

Non-Final Office Action for U.S. Appl. No. 12/260,764, mailed on Jun. 13, 2012, Brent Russell Smith et al., "Organizing Collaborative Annotations", 28 pages.

Kolovshi et al., "Towards E-learning via the Semantic Web", International Conference on Computer Systems and Technologies, 2003, 6 pages.

Office action for U.S. Appl. No. 13/077,699, mailed on Nov. 8, 2012, Lynnes et al., "Tagging Annotations of Electronic Books", 14 pages.

Office action for U.S. Appl. No. 12/260,764, mailed on Dec. 21, 2012, Smith et al., "Organizing Collaborative Annotations", 29 pages.

Shelburn, "E-book usage in an academic library: User attitudes and behaviors", Elsevier Inc., Library Collections, Acquisitions, & Technical Services 33, 2009, 14 pages.

U.S. Appl. No. 12/260,713, filed Oct. 29, 2008, Smith et al., "Providing Presence Information Within Digital Items".

Li et al., "Towards Effective Browsing of Large Scale Social Annotations", International World Wide Web Conference Committee, 2007, 10 pages.

Office action for U.S. Appl. No. 12/260,764, mailed on Apr. 11, 2013, Smith et al., "Organizing Collaborative Annotations", 33 pages.

Office action for U.S. Appl. No. 13/077,699, mailed on Apr. 4, 2013, Lynnes et al., "Tagging Annotations of Electronic Books", 18 pages.

Wolfe, "Annotation technologies: A software and research review", Elsevier Science Inc., Computers and Composition 19, 2002, 27 pages.

Office Action for U.S. Appl. No. 12/260,713, mailed on Sep. 25, 2013, Brent Russell Smith, "Providing Presence Information Within Digital Items", 19 pages.

Office action for U.S. Appl. No. 12/260,764, mailed on Sep. 9, 2013, Smith et al,, "Organizing Collaborative Annotations", 34 pages.

Fish et al.,"Quilt: a collaborative tool for cooperative writing", 1998, ACM, pp#30-pp#37.

Non-Final Office Action for U.S. Appl. No. 12/260,764, mailed on Jul. 6, 2011, Brent Russell Smith, "Organizing Collaborative Annotations".

Office Action for U.S. Appl. No. 13/077,699, mailed on Nov. 21, 2013, Brett N. Lynnes, "Tagging Annotations of Electronic Books", 15 pages.

Final Office Action for U.S. Appl. No. 12/260,713, mailed on Mar. 18, 2014, Brent Russell Smith, "Providing Presence Information Within Digital Items", 16 pages.

* cited by examiner

FACILITATING DISCUSSION GROUP FORMATION AND INTERACTION

BACKGROUND

Many forums exist that allow people to express their ideas and opinions concerning a particular subject. For example, members of a community may form a book club to discuss books that are of interest to them. In recent years, online forums have increased in prevalence. Media outlets and individuals have started online book clubs and online discussion groups that may focus on particular books, movies, or television programming. However, it can be difficult for a person to filter through all of the information available about various discussion groups to find a discussion group that includes members with certain characteristics. In some cases, discussion group information and discussion group member information may not be accessible to the public to aid a person in finding an appropriate discussion group. Providing an opportunity to conveniently identify relevant discussion groups may increase the membership of discussion groups and increase sales of media items, such as books and movies, related to the discussion groups.

Additionally, discussion group members may want to directly communicate with each other outside of the meetings of the discussion group. For example, a book club member may want to share a comment or observation with other members of the book club while reading a particular portion of a work. Some consumer electronic devices allow a user to access an electronic version of a media item, such as an electronic book ("eBook"). However, consumer electronic devices have not historically provided discussion group members with the capability to access a particular media item and conveniently communicate directly with other members of the discussion group via the same consumer electronic device. A consumer electronics device capable of providing communication between discussion group members while accessing a media item associated with the discussion group may also lead to increased discussion group membership and increased sales of media items related to the discussion groups, as well as, increasing purchases of the consumer electronic device.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Figure 1:
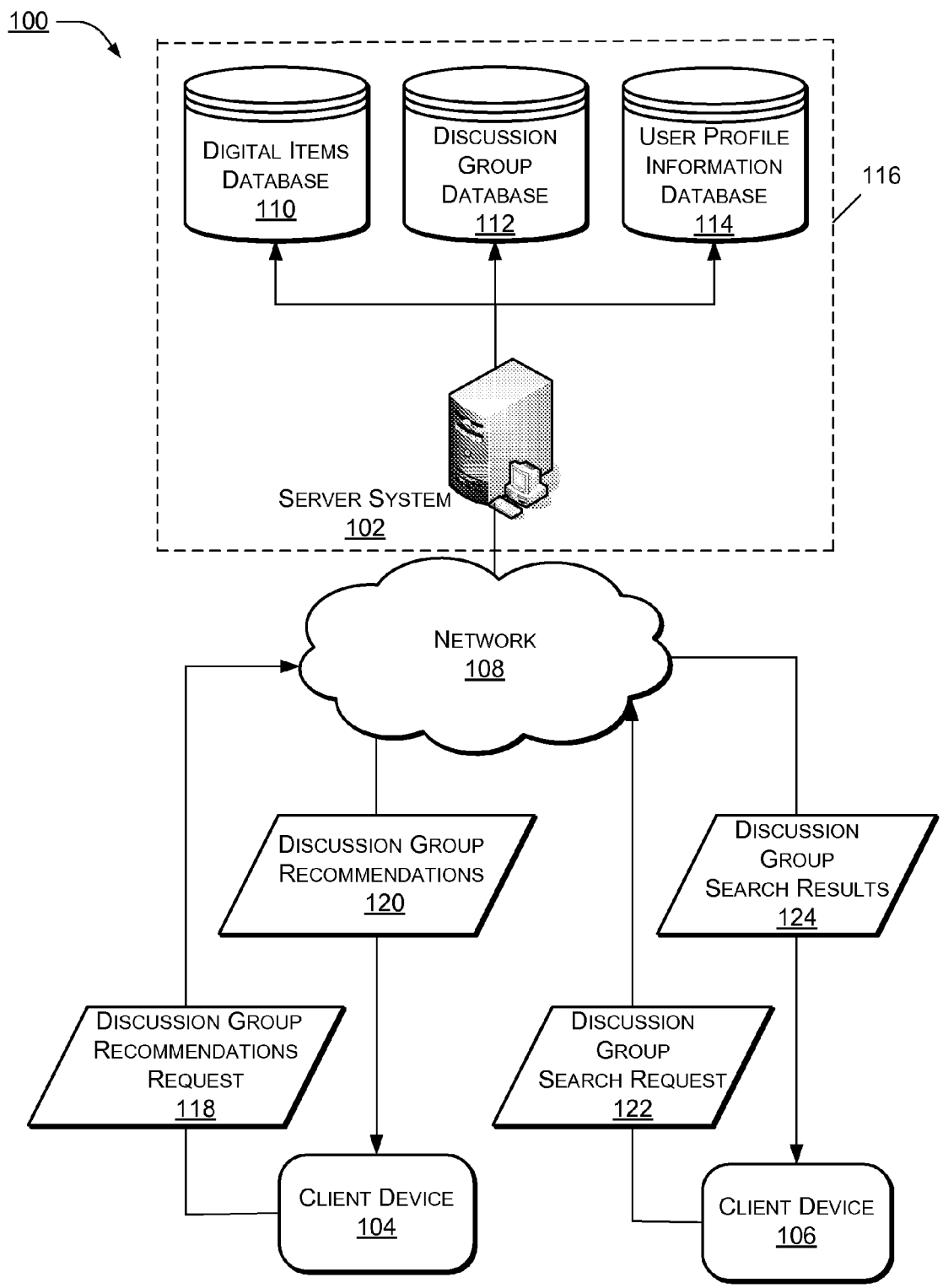
FIG. 1 is a pictorial diagram of an illustrative computing environment that includes a server system and a number of client systems communicatively connected via a network.

This disclosure sets forth functionality for facilitating discussion group formation and interaction. The functionality may be manifested in various systems, modules, computer readable media, data structures, methods, and other forms.

Overview

This disclosure describes facilitating discussion group formation and interaction. Online services gather information associated with media items presented for sale via the online services. For example, an online service may collect reviews for books, movies, and audio content offered for sale via the online service. The online service may also collect information of users of the online service that purchase media items offered for sale via the online service. In an example, the online service may keep a history of media items purchased by a particular user. Further, an online service may collect information of discussion groups associated with media items offered for sale via the online service. To illustrate, an online service may identify one or more book groups associated with a book sold via the online service. The online service can utilize the collected information to provide personalized recommendations for discussion groups of media items purchased by a user of the online service. The personalized recommendations may reflect the demographics, interests, physical location, or other characteristics important to the user. Additionally, a user of the online service may be able to conduct a search according to criteria specified in a search request to find discussion groups with members having characteristics that are important to the user. In this way, users of the online service may readily identify discussion groups that are of interest to the user and that are associated with certain media items. Enhancing a user's experience with the online service by facilitating convenient identification of relevant discussion groups may result in increased involvement in discussion groups and increased purchases of media items related to the discussion groups.

Further, members of discussion groups may participate in meetings in a variety of ways from meeting together at a physical location to participating in an online discussion using a consumer electronics device, such as a personal computer, a wireless communication device, a portable music player, an eBook reader device, or a personal digital assistant (PDA). Outside of the discussion group meetings, members may want convenient options to communicate with other discussion group members. In some cases, a discussion group member may want to communicate with other discussion group members while participating in an activity associated with a media item relating to the discussion group, for example while reading a particular book. When the media item is an electronic version of a book or otherwise accessible via a consumer electronic device, such as a CD, mp3 file, or DVD, a discussion group member may want to use the consumer electronic device to both access the media item and communicate with other discussion group members at the same time. A consumer device that conveniently allows a user to access media items and communicate directly with discussion group members may enhance the user's experience with the consumer electronic device and with discussion groups. Enhancing the user's experience may lead to increased use and sales of the consumer electronic device, increased participation in discussion groups, and increased sales of media items associated with discussion groups.

Throughout this disclosure, techniques for facilitating book group formation and interaction are described. However, the techniques described herein are applicable to facilitating formation and interaction of discussion groups related to other media items.

Illustrative Computing Environment

FIG. 1 is a pictorial diagram of an illustrative computing environment 100 that includes a server system 102 and a number of client devices 104, 106 communicatively connected via a network 108. Although two client devices are shown in FIG. 1, the computing environment 100 may include any number of client devices. The network 108 may include a local area network, a wide area network, such as a public switched telephone network (PSTN), a cable television network, a satellite network, a collection of networks, a public Internet Protocol (IP) network, a private IP network, or a combination thereof. Moreover, the network 108 may be wired, wireless, or a combination of the two. The computing environment 100 also includes a digital items database 110, a discussion group database 112, and a user profile information database 114. The digital items database 110, the discussion group database 112, and the user profile information database 114 may be integrated with the server system 102 or otherwise communicatively coupled with the server system 102. In an illustrative embodiment, the digital items database 110, the discussion group database 112, and the user profile information database, 114 may include one or more CD-RW/DVD-RW drives, hard disk drives, tape drives, or other storage devices that are utilized to store digital content and information. The server system 102, separately or together with the digital items database 110, the discussion group database 112, and the user profile information database 114 may provide an online service 116 that facilitates discussion group formation and interaction.

The first client device 104 and the second client device 106 may each include a personal computer, an eBook reader device, a laptop computer, a personal digital assistant (PDA), a portable gaming device, a wireless communication device, such as a smart phone or mobile handset, a set-top-box, a game console, a portable music player, or any combination thereof. In addition to communicating with each other via the network 108, the first client device 104 and the second client device 106 may communicate via peer-to-peer wired or wireless connections. As will be described with regard to the particular implementations shown herein, the server system 102 is configured to exchange data and information, including digital items and discussion group recommendations, among the client devices 104, 106. In some circumstances, the server system 102 may be associated with a merchant, such as an online retailer authorized to provide a marketplace for selling and distributing digital items, other media content, such as books, compact discs, digital video discs, and blu-ray discs, and other products to consumers. However, in other examples, the server system 102 may be associated with a site facilitating sale or distribution of items by other sellers, a social networking site, an academic or educational site, or any other online site.

The digital items database 110 stores electronic media files comprising a plurality of digital items that may be accessible to the client devices 104, 106 via the network 108. For example, the online service 116 may sell and distribute digital items to consumers via the client devices 104, 106. A "digital item" as used herein may include any type of content that can be stored and distributed in digital form. For example, digital items may include without limitation, text content, text formatting, image content, audio content, video content, hypertext protocol content, and so on, or any combination of these kinds of content. Some specific examples of digital items include, without limitation, all forms of textual information, such as books, magazines, newspapers, newsletters, periodicals, journals, reference materials, telephone books, textbooks, anthologies, proceedings of meetings, forms, directories, maps, manuals, guides, references, articles, reports, documents, etc., and all forms of audio and audiovisual works such as music, multimedia presentations, audio books, movies, still images, pictures, photographs, or any combination thereof. Additionally, "digital item" may refer to a portion of a larger work, such as a chapter of a book, or a song of an album, etc. Further, a digital item may refer to a larger compilation of component items which are related in any manner. For instance, an item may refer to multiple issues of a magazine in a particular year.

The discussion group database 112 stores information associated with a number of discussion groups. The server system 102 may receive information from one or more discussion groups and store the information in the discussion group database 112. In some instances, discussion group members may be users of the online service 116. Additionally, the server system 102 may be configured to automatically search the Web to collect information associated with discussion groups and store the collected information in the discussion group database 112. Further, an operator of the server system 102 may manually search the Web, make phone calls, or otherwise gather information associated with discussion groups and enter the information in the discussion group database 112.

The information associated with each discussion group may include a list of members of the discussion group, a description of the discussion group, a meeting time of the discussion group, a date when the discussion group started meeting, a date when the discussion group will begin meeting, a frequency of meetings of the discussion group, a number of members of the discussion group, an address for a Web page of the discussion group, a meeting location of the discussion group, or a combination thereof. The discussion group database 112 may also include demographic information of members of each book club, such as age, profession, educational level, gender, etc. The discussion groups may meet to discuss a particular book, movie, performance, such as a concert or play, an album, an artist, other written, video, or audio content, or a combination thereof. The discussion group may meet online, in a physical location, such as a residence or restaurant, or a combination thereof.

The user profile information database 114 stores data relating to profiles of users of client devices, such as users of client devices 104, 106. The client device users may also use the online service 116 to purchase media items. User profile information may be entered by users of the client devices 104, 106 when purchasing media items via the online service 116, when filling out a user profile questionnaire provided by the online service 116, when submitting other information related to media items offered for sale via the online service 116, such as a review of a particular media item, or a combination thereof. The user profiles may include demographic information, such as age, occupation, geographic location, location of residence, discussion group memberships, interests, educational level, hobbies, previous media items purchased via the online service 116, such as eBooks downloaded from the digital items database, other personal information, or a combination thereof. In some embodiments, users of the online service 116 may choose to limit the amount of information included in their user profile or to limit access to their user profile information.

The user profiles may also include identifiers for other users of client devices that are included in a Friends and Family group. A Friends and Family group may include members of groups that a particular user is associated with, such as an educational class, a social networking group, a discussion group, or a combination thereof. User profile information may also specify that a particular user has designated to communicate freely with members of a respective Friends and Family group, but that communication with others is restricted or otherwise limited to those obtaining permission from the particular user. The user profile information may be used by the server system 102 to identify discussion groups that may be of interest to users of the client devices 104, 106. In addition, the user profile information may be used by the server system 102 to derive demographic data for discussion groups, such as average age, male/female ratio, etc. and store the demographic data associated with the discussion groups in the discussion group database 112.

In a particular embodiment, a user of the client device 104 may purchase, or otherwise access, items via the online service 116. In one example, a user of the client device 104 may purchase physical items, such as a book, CD, or DVD. Additionally, a user of the client device 104 may purchase tickets to an artistic performance, such as a concert or play, a movie, or some other event. A user of the client device 104 may also purchase digital items stored in the digital items database 110, such as an eBook, an electronic version of an album, or an electronic version of a song. In a particular embodiment, the client device 104 may send a request to access a particular digital item to the server system 102. The request may relate to accessing all of the content of the digital item or a specified portion of the content of the digital item. In one example, in response to receiving a request to access a digital item, the server system 102 sends digital item content to the client device 104. The digital item content can be accessed via an output device, such as a display and/or speakers, of the client device 104. To illustrate, the server system 102 may send data related to a Web page including the text of a portion of an eBook to the client device 104. As a user of the client device 104 navigates through a digital item, the client device 104 may send additional requests to view other portions of the digital item, such as for other pages of the eBook. In turn, the server system 102 may send content of the digital item relating to the additional requests for each portion of the digital item, such that the content of the digital item provided to the user via the client device 104 is continuously updated. In another example, the server system 102 may send all of the data related to the content of the digital item to the client device 104 to be downloaded and stored in memory of the client device 104. The digital item content stored at the client device 104 may be accessed upon receipt or accessed at a later time. Further, the digital item content may be streamed from the server system 102 to the client device 104.

After a client device user purchases or accesses a media item, the server system 102 may send a user interface including an option to recommend a discussion group to the user of the client device 104. The user of the client device 104 may select the option to recommend a discussion group and thereby send a discussion group recommendations request 118 to the server system 102. In one example, a user of the client device 104 may purchase tickets to a particular play and the discussion group recommendations request 118 may be directed to identifying discussion groups that are discussing the play after the user of the client device 104 attends the performance. In another example, a user of the client device 104 may purchase an eBook and the discussion group recommendations request 118 may be directed to identifying book clubs reading the eBook.

Upon receiving the discussion group recommendations request 118, the server system 102 may identify user profile information of the user of the client device 104 stored in the user profile information database 114. The server system 102 may attempt to match the user profile information of the user of the client device 104 with user profile information of other users having similar characteristics and interests who are members of a discussion group that is associated with the media item purchased by the user of the client device 104. For example, a user of the client device 104 living in Los Angeles, Calif., who is 25 years old and working as a teacher may purchase tickets to a performance of the play Les Miserables and send a discussion group recommendations request to the server system 102. In response, the server system 104 may parse the user profile information database 114 and/or the discussion group database 112 to find one or more discussion group that are discussing Les Miserables. The server system 102 may narrow the results by identifying the discussion groups that include members having a similar user profile to the user of the client device 104, for example discussion groups having members living in Los Angeles, Calif. around the age of 25 and working in an educational field.

The server system 102 may generate discussion group recommendations 120 based on the user profile of the user of the client device 104 and based on the data included in the user profile information database 114 and/or the discussion group database 112 and forward the discussion group recommendations 120 to the client device 104. The discussion group recommendations 120 include identifiers of one or more recommended discussion groups. After receiving the discussion group recommendations 120, the user of the client device 104 may decide to join one or more of the discussion groups included in the discussion group recommendations 120.

In a particular embodiment, a user of the client device 106 may utilize the client device 106 to send a discussion group search request 122 to identify discussion groups associated with particular search criteria specified in the discussion group search request 122. The user of the client device 106 may or may not have purchased or accessed a media item via the online service 116. By sending a discussion group search request rather than a discussion group recommendations request, the user of the client device 106 can control the discussion group search with more specificity and base the search on individual criteria that may be more important to the user, rather than having the server system 102 identify discussion groups recommendations based on default criteria. In an illustrative embodiment, the discussion group search request 122 may be directed to requesting discussion groups associated with the book *War and Peace* by Leo Tolstoy with members having an average age of 40 and having a Russian ethnic heritage.

In response to receiving the discussion group search request 122, the server system 102 may search the discussion group database 112 and the user profile information database 114 for discussion groups that include members having search criteria specified in the discussion group search request 122. To illustrate, the server system 102 may parse the discussion group database 112 for discussion groups associated with a particular book, such as *War and Peace* in the example above, and then identify members of the discussion group. The server system 102 may then parse the user profile information database 114 for the user profiles of the members of each particular discussion group to identify the members of a particular discussion group that meet the search criteria of the discussion group search request 122. The server system 102 may rank the discussion groups identified based on the percentage of members that are associated with the specified search criteria. For example, a discussion group with 75% of members meeting the search criteria specified in the discussion group search request 122 would rank ahead of a discussion group with 45% of the members meeting the specified criteria. The server system 102 may send discussion group search results 124 to the client device 106 including identifiers of one or more of the discussion groups matching one or more of the search criteria of the discussion group search request. In one embodiment, the discussion group search results 124 may include a limited number of the identified discussion groups, possibly based on the ranking of the discussion group, such that only a threshold number of discussion group identifiers are included in the discussion group search results 124.

Further, in an embodiment where a user of the client device 104 and a user of the client device 106 are members of the same discussion group, the users of the client devices 104, 106 may communicate with each other. In one aspect, the client device users may communicate online during a meeting of the discussion group by posting comments to a discussion board. In another aspect, the client device users may communicate directly via the client devices 104, 106 during an online meeting of the discussion group or outside of the context of a discussion group via chat, email, text message, or video. In some embodiments, communications between users of the client devices 104, 106 and other discussion group members may be routed through the server system 102. In this way, the server system 102 may store chat sessions and discussion forums of discussion groups for subsequent access by discussion group members or by other interested individuals or groups.

Illustrative User Experience

FIGS. 2-6 illustrate pictorial diagrams of illustrative user interfaces 200-600 that are related to facilitating discussion group formation and interaction. Each of the user interfaces 200-600 may be provided via a display of a client device, such as the client devices 104 and 106 of FIG. 1 and the eBook reader device 800 of FIG. 8. The user interfaces 200-600 may be generated based on instructions stored at the client device. In one embodiment, the instructions may be associated with proprietary software provided by the manufacturer of the client device or by an entity facilitating discussion group formation and interaction. In another embodiment, the instructions may be associated with a publicly available viewer, such as the Adobe® Reader®, provided by Adobe Systems, Inc. of San Jose, Calif., Windows Media® Player, provided by Microsoft Corporation of Redmond, Wash., iTunes®, provided by Apple, Inc of Cupertino, California. Additionally, each of the user interfaces 200-600 may be generated as a Web page and served to a browser executing at the client device via the Internet.

Figure 2:
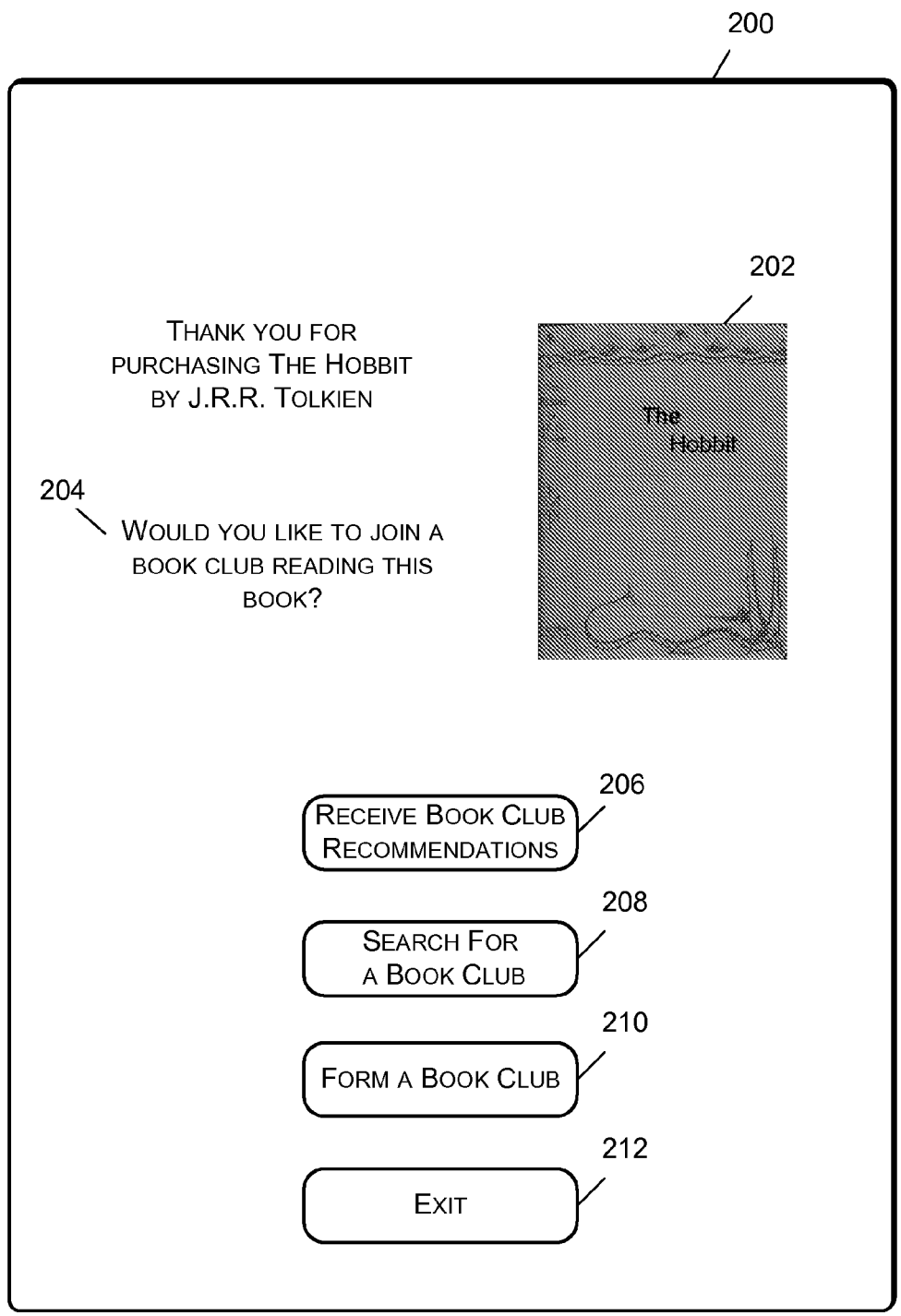
FIG. 2 is a pictorial diagram of an illustrative user interface configured to provide options for identifying a book club associated with a particular book.

FIG. 2 is a pictorial diagram of an illustrative user interface configured to provide options for identifying a book club associated with a particular book. The user interface 200 includes a book 202 that has been purchased by a user of a client device. In particular, the user interface 200 of FIG. 2 shows that a user of client device has purchased *The Hobbit* by J. R. R. Tolkien. The book may be purchased via an online service, where items may be bought and sold. In one example, the online service may include a Website of an online retailer. Additionally, the user interface 200 includes text 204 inviting the user of the client device to identify book clubs that are reading the book purchased. In some embodiments, the book may be a physical hardback or paperback book that will be shipped from a remote location to the user of the client device. In other embodiments, the book may be an electronic version of the book that is downloaded from a server, such as the server system 102 of FIGS. 1, 6, and 7.

Figure 4:
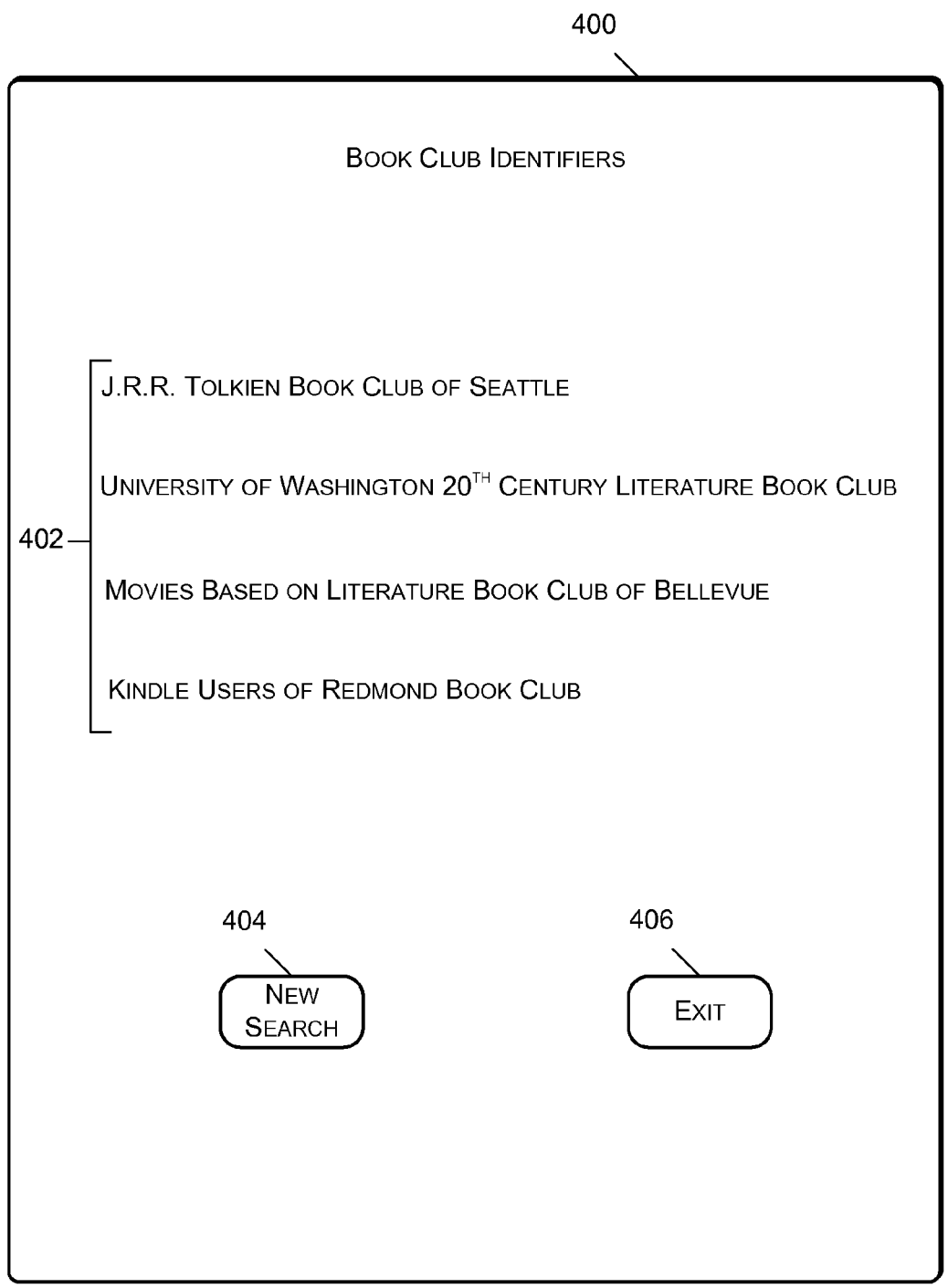
FIG. 4 is a pictorial diagram of an illustrative user interface configured to provide book club identifiers of book clubs meeting the criteria of a book club search request or a book club recommendations request.

The user interface 200 also includes display icons 206-212. The first display icon 206 is selectable to send a request to receive one or more recommendations for a book club associated with the book purchased (as illustrated in FIG. 1 by the request 118 being sent to the server system 102). The book club recommendations may be based on user profile information of the user of the client device. The user profile information may include demographic information, interests, hobbies, additional personal information, such as education level or profession, geographic location of the user, or a combination thereof. The book club recommendations may also be based on previous books purchased by the user, other book clubs the user has joined, book clubs joined by purchasers of other books by the same author, book clubs joined by purchasers of books of a similar genre, or a combination thereof. An example of book club recommendations received in response to a book club recommendations request is shown in FIG. 4.

The second display icon 208 is selectable to send a request to search for a book club by identifying one or more book clubs associated with search criteria specified in the request (as illustrated in FIG. 1 by the request 122 being sent to the server system 102). An example of a user interface to generate a request to search for a book club associated with specified criteria is shown in FIG. 3.

The third display icon 210 is selectable to form a book club associated with the purchased book. For example, selection of the third display icon 210 may launch one or more additional user interfaces that include a number of options to facilitate forming a book club, such as selecting a name, inviting others to join the book club, etc. In one instance, the third display icon 210 may be included in the user interface 200 when the purchased book is not associated with any book clubs. In this instance, the first display icon 206 and the second display icon 208 may not be included in the user interface 200. The fourth display icon 212 is selectable to exit the user interface 200 and return to a default user interface or to another user interface that allows a user to continue shopping for additional items.

Figure 3:
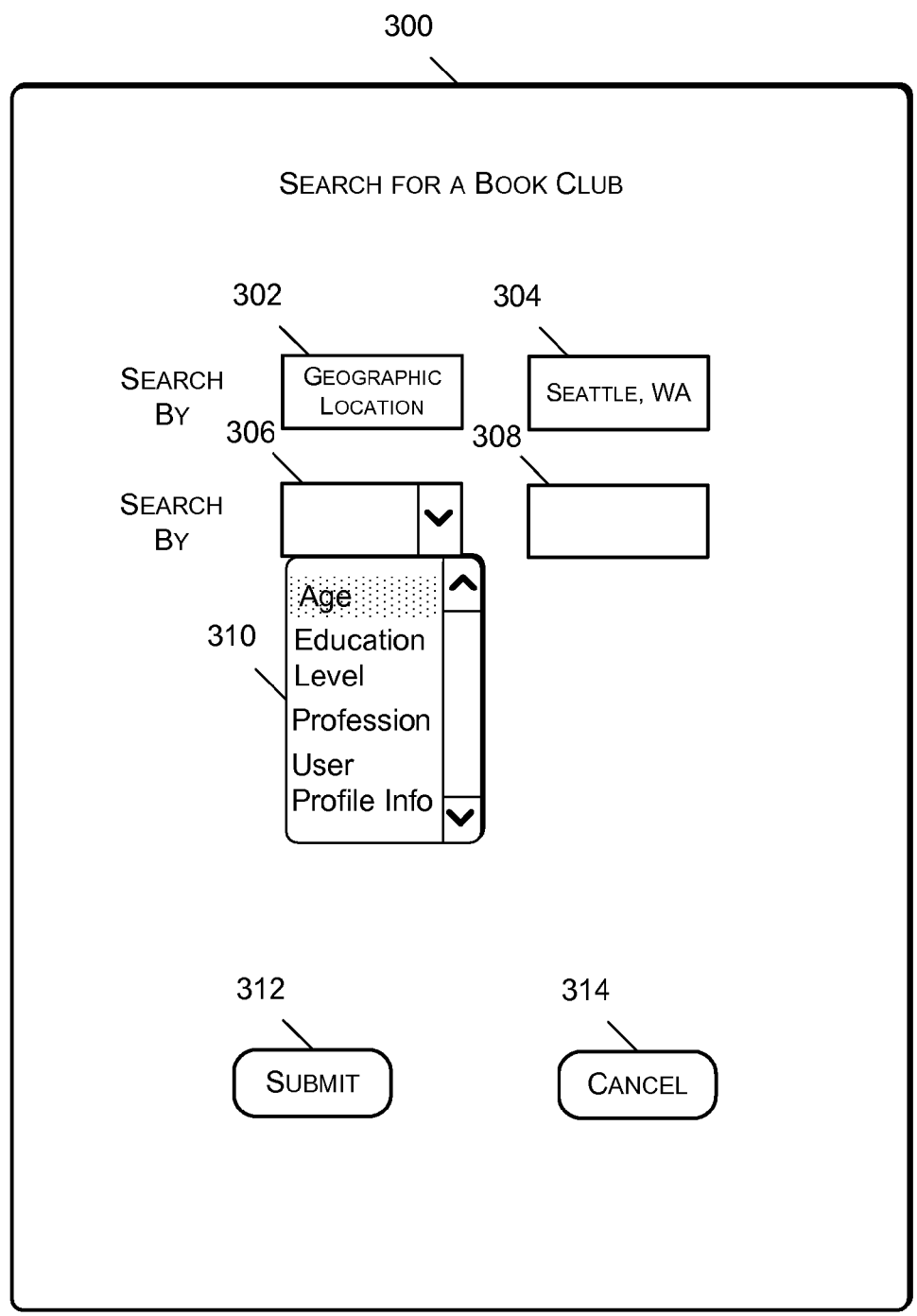
FIG. 3 is a pictorial diagram of an illustrative user interface configured to enter a request to identify book clubs matching specified search criteria.

FIG. 3 is a pictorial diagram of an illustrative user interface 300 configured to enter a request to identify book clubs matching specified search criteria. In a particular embodiment, the user interface 300 may be generated upon selection of the option 208 in FIG. 2.

The user interface 300 includes a number of fields 302-308. The fields 302-308 are configured to receive search criteria entered by a user of a client device. The user may input search criteria freeform or, as shown in FIG. 3, by selecting from among predetermined options. The search criteria may be entered into the fields 302-308 via strokes of a keyboard, operation of a pointing device, such as a mouse, operation of a stylus, combinations thereof, or other suitable user input means. The search criteria are utilized to generate a book club search request to identify book clubs that are associated with a particular book that meet the search criteria entered via the fields 302-308. For example, the field 302 indicates an input to search for others reading a particular book based on geographic location and the field 304 indicates a selection of the geographic location "Seattle, Wash." Thus, in an illustrative embodiment, a book club search request submitted via the user interface 300 may be directed to identifying a book club associated with *The Hobbit* that is located in Seattle, Wash.

A book club search request may be further narrowed by entering search criteria into the fields 306 and 308. For example, a user may select the field 306 and a drop-down menu 310 may appear with a number of additional search criteria. The drop-down menu 310 includes the search criteria: age, education level, profession, and user profile information. Upon making a selection from the drop-down menu 310, the user may enter a specific value for the selected option, such as an age range or a type of profession, in the field 308. An additional drop-down menu (not shown) may also be used to enter criteria in the field 308. For example, a drop-down menu for the field 308 may include age ranges, types of professions, and educational levels. The selection of the user profile information option of drop down menu 310 may relate to matching specified user profile information of a user viewing the user interface 300 with user profile information of other client device users.

Further, the user interface 300 includes display icons 312, 314. Upon selection of the display icon 312, a book club search request may be generated to identify book clubs associated with a particular book based on the search criteria entered in the fields 302-308. The selection of the display icon 312 may also prompt the client device providing the user interface 300 to send the book club search request to a server system. Selection of the display icon 314 may cancel a particular presence information search request and/or clear one or more of the fields 302-308.

FIG. 4 is a pictorial diagram of an illustrative user interface 400 configured to provide book club identifiers 402 specifying book clubs meeting the criteria of a book club search request or a book club recommendation request. For example, the user interface 400 may have been provided in response to submitting a book club recommendation request via the user interface 200. In another example, the user interface 400 may have been provided in response to submitting a book club search request via the user interface 300.

FIG. 4 indicates that there are four book clubs included in the book club identifiers 402. Each of the book club identifiers may be selectable. Upon selection of a book club identifier, a user of a client device may be re-directed to a user interface that includes information associated with the selected book club, such as a Web page associated with the selected book club. Additionally, or alternatively, the user may be re-directed to a user interface that provides the user with the opportunity to join the selected book club. Further, selection of a book club identifier may cause an overlay or pop-up window to appear that includes additional information about the selected book club, such as a Web address for a Web site associated with the book club, a meeting place of the book club, a meeting time for the book club, a brief description of the book club, or a combination thereof.

The user interface 400 also includes display icons 404 and 406. The display icon 404 may be selectable to conduct a new book club search. In one example, selection of the display icon 404 may return a user to a user interface similar to the user interface 300. The display icon 406 is selectable to exit the user interface 400.

With reference to FIG. 4, in an illustrative example, a user viewing the user interface 400 may select a particular book club identifier, such as the "J. R. R. Tolkien Book Club of Seattle" identifier, and subsequently join a book club associated with the selected identifier. After joining the book club, the system architecture described herein facilitates discussion forums about a particular book. For instance, members of the J. R. R. Tolkien Book Club of Seattle may decide to read *The Hobbit* and participate in one or more electronic discussion forums regarding this book. One example of an electronic discussion forum relating to a particular book is provided below with respect to FIG. 5.

Figure 5:
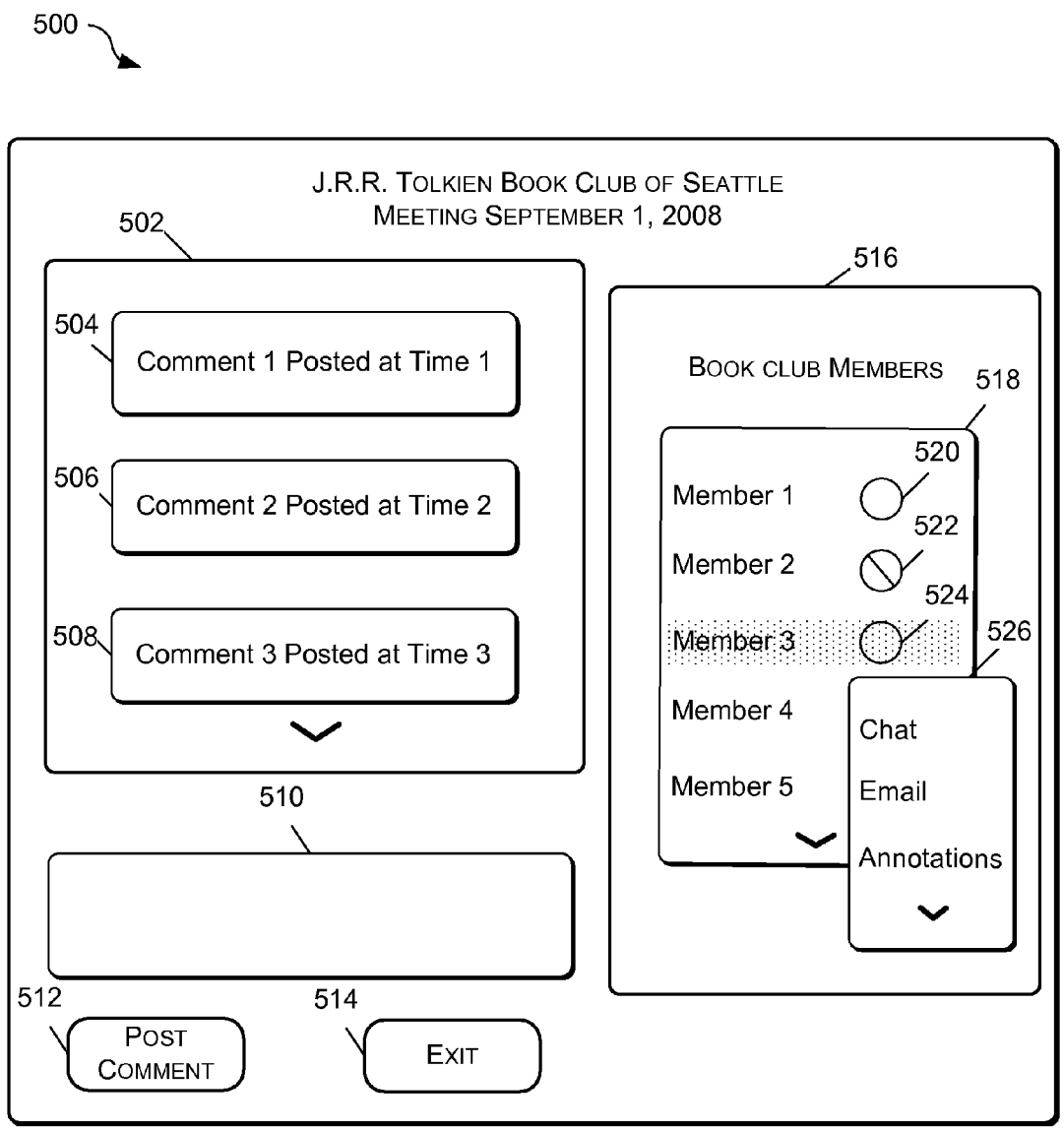
FIG. 5 is a pictorial diagram of an illustrative user interface configured to enter a comment during a meeting of a book club, show comments posted by other members during a meeting of the book club, and provide communication options with respect to other members of the book club.

FIG. 5 is a pictorial diagram of an illustrative user interface 500 configured to enter a comment during a meeting of a book club, show comments posted by other members during a meeting of the book club, and provide communication options with respect to members of the book club. The user interface 500 includes a first display portion 502. The first display portion 502 includes a number of comments 504-508 posted by members of a book club during a meeting of the book club. In particular, the first display portion 502 of FIG. 5 includes comments posted by members of the J. R. R. Tolkien Book Club of Seattle at a meeting on Sep. 1, 2008. The first display portion includes a first comment 504, a second comment 506, and a third comment 508. The comments 504-508 may be posted by one or more members of the book club and the first display portion 502 may also include identifiers (not shown) of book club members posting particular comments. In addition, the comments 504-508 may include text of the comment, a time that the comment was posted, other information associated with the particular comment, or a combination thereof. In some embodiments, the first display portion 502 may include comments posted in a live meeting of the book club. In other embodiments, the first display portion 502 may include archived comments posted in a previous meeting of the book club. Further, the first display portion 502 may allow a user to scroll through the posted comments to view the most recently posted comments or comments that had been previously posted closer to the beginning of the book club meeting.

The user interface 500 also includes a comment window 510 configured to enter text of a comment. A book club member viewing the user interface 500 may select the comment window 510 utilizing one or more user input devices and proceed to enter text of a comment via the one or more user input devices. The user interface 500 also includes display icons 512 and 514. The display icon 512 is selectable to post a comment entered via the comment window 510. Selection of the display icon 512 to post a comment results in sending the comment to a server facilitating the book club meeting and subsequently showing the posted comment in the first display portion 502. The display icon 514 is selectable to exit the user interface 500 and proceed to another user interface, such as a Web page of the book group, a Web page of another entity hosting the book club meeting, such as an online service, or a default user interface.

Further, the user interface 500 includes a second display portion 516. The second display portion 516 includes a member information window 518. The member information window 518 includes identifiers of book club members participating in a meeting of the book club. For example, the member information window 518 indicates that members 1-5 are participating in the book group meeting. Additional members of the book group may be participating in the book club meeting and a book club member viewing the user interface 500 may scroll through the members of the book club participating in the meeting via the member information window 518.

FIG. 5 indicates that an identifier "Member 3" associated with a particular book club member has been selected based on the highlighting of the identifier shown in FIG. 5. The identifier associated with a particular book club member may be specified by a book club member viewing the user interface 500, by the member associated with the identifier, or by an administrator of a system facilitating book club formation and interaction, such as an administrator of an online service. The second display portion 516 also includes a menu 526 that provides options relating to a selected identifier, such as the identifier "Member 3." For example, the menu 526 includes the options "chat", "email", and "annotations." Selection of the option "chat" may initiate a chat conversation with the book club member associated with the selected identifier, that is Member 3. Selection of the option "email" may initiate composing an email to the book club member associated with the selected identifier. Further, the option "annotations" may be selected to view annotations provided by the book club member associated with the selected identifier. Additional options (not shown) that can be provided by the menu 526 include an option to initiate a video conference with the selected book club member, an option to compose a text message to the selected book club member, and an option to view only comments posted by the selected book club member. The menu 526 may appear in response to a user input, such as a right click of a mouse, hovering a pointer over the identifier, double-clicking on the selected identifier, or by keyboard strokes. The menu 526 enables a book club member viewing the user interface 500 the opportunity to not only participate in a book club meeting by reading and posting comments, but also the opportunity to directly communicate with another book club member during the meeting via chat, email, text message, or another mode of communication.

The selection of an option available in the menu 526 may result in the appearance of another user interface that may overlay or replace the user interface 500 or the appearance of an additional display portion configured to execute the functions associated with the selected option. For example, selection of the "chat" option may launch an application that opens a separate window and facilitates a chat conversation to take place between the user viewing the user interface 500 and a selected book club member via the separate window. In another example, selection of the "annotations" option may open a separate window showing annotations entered by a selected book club member. In this example, the separate window may also show a portion of the book that corresponds to each annotation.

The window 518 also includes availability indicators 520-524 that specify whether or not a particular book club member is available to communicate directly with a book club member viewing the user interface 500. The indicator 520 specifies that the book club member associated with the identifier "Member 1" is available to communicate with the user viewing the user interface 500 and the indicator 524 specifies that the book club member associated with the identifier "Member 3" is also available to communicate with the user viewing the user interface 500. However, the indicator 522 specifies that the user "Member 2" is not available to communicate with the user viewing the user interface 500.

The availability indicators 520-524 may indicate the availability of a particular book club member to communicate directly with other book club members based on a color of the respective availability indicator 520-524. For example, a red availability indicator may indicate that a book club member is not available to communicate with other book club members, while a green availability indicator may indicate that a book club member is available to communicate with other book club members.

A book club member's availability may be limited based on user profile information. To illustrate, a book club member may indicate in a user profile a desire to only communicate with particular book club members, or with book club members associated with specified characteristics, such as book club members of a particular age or profession. In addition, the availability of a book club member may be based on a login procedure, such that book club members that have completed a login procedure via a user interface to participate in a book club meeting appear to be available to communicate with other book club members, while book club members that have not completed the login procedure appear to be unavailable to communicate with other book club members. Further, the availability of a book club member to communicate with other book club members may be determined based on the connection of a client device associated with the book club member to a network. For example, when a client device of a book club member is turned off or otherwise inaccessible via a network, such as the Internet or a wide area wireless data network, the book club member may appear to be unavailable to communicate with other book club members. In some embodiments, the user interface 500 may include one or more display icons (not shown) that are selectable to specify that the book club member viewing the user interface 500 is available or unavailable.

Figure 6:
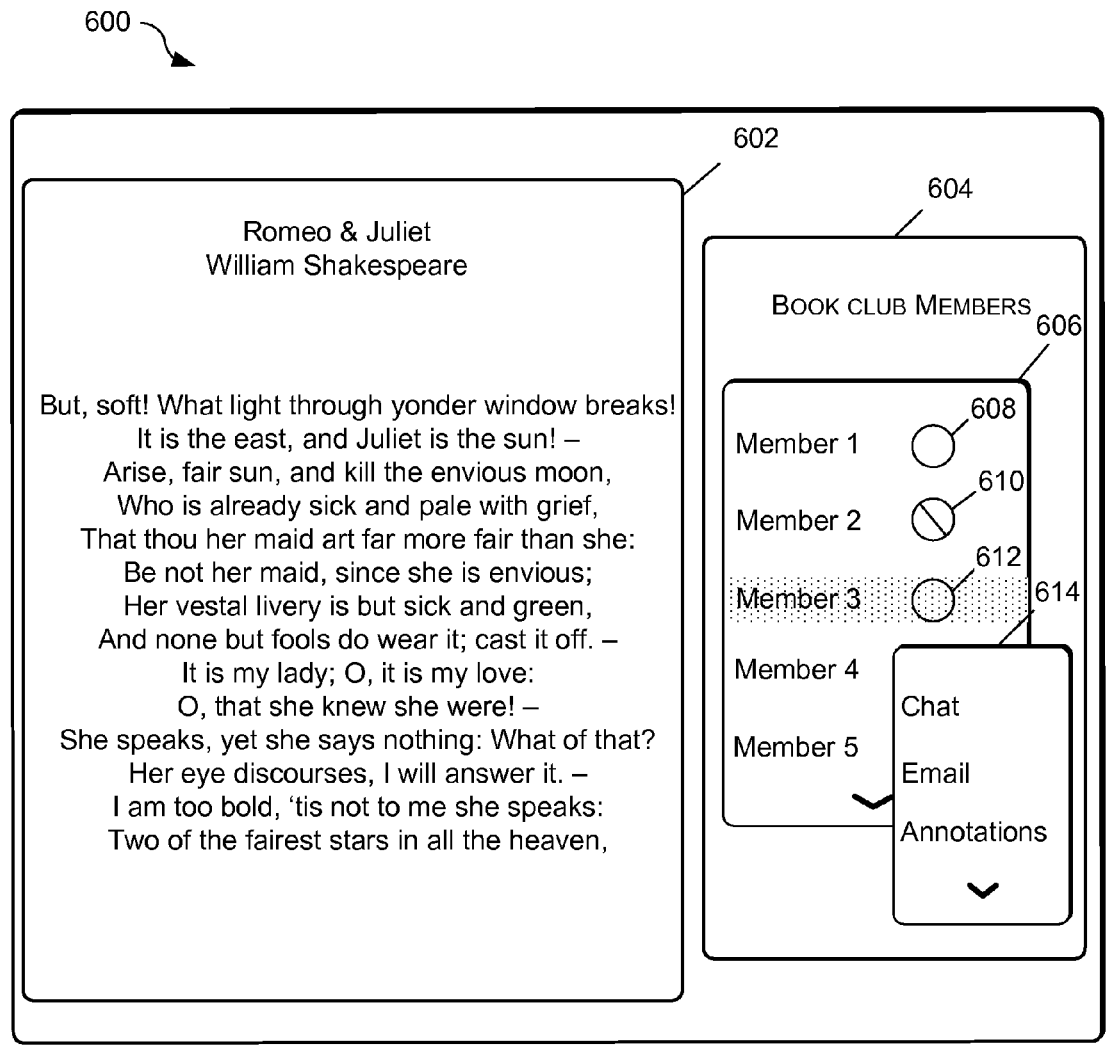
FIG. 6 is a pictorial diagram of an illustrative user interface configured to provide options for a user of a client device to communicate with other members of a book club while viewing a portion of a particular eBook.

FIG. 6 is a pictorial diagram of an illustrative user interface 600 configured to provide options for a user of a client device to communicate with other members of a book club while viewing a portion of a particular eBook. The user interface 600 includes a first display portion 602. The first display portion 602 includes text of an eBook, which may be a book that is being read by a particular book club. In particular, the first display portion 602 includes text from William Shakespeare's Romeo and Juliet.

Further, the user interface 600 includes a second display portion 604. The second display portion 604 includes a member information window 606. The member information window 606 includes identifiers of a number of book club members. For example, the member information window 606 includes respective identifiers of Members 1-5 of a book club. Identifiers of additional members of the book group may be may displayed by scrolling through a list of book club members via the member information window 606. The window 606 also includes availability indicators 608-612 that specify whether or not a particular book club member is available to communicate directly with a user viewing the user interface 600.

FIG. 6 indicates that an identifier "Member 3" associated with a particular book club member has been selected based on the highlighting of the identifier shown in FIG. 6. The second display portion 604 also includes a menu 614 that provides options relating to a selected identifier, such as the identifier "Member 3." For example, the menu 614 includes the options "chat", "email", and "annotations." Additional options (not shown) that can be provided by the menu 614 include an option to initiate a video conference with the selected book club member and an option to compose a text message to send to the selected book club member. The selection of an option available in the menu 614 may result in launching an application to execute the function associated with the selected option. The options included in the menu 614 provide a book club member viewing the user interface 600 with the opportunity to communicate with other book club members outside of a meeting of the book club about books that are being read by the book club members. In particular, a book club member viewing the user interface 600 may communicate with other book club members about a particular portion of a book, while reading that portion of the book via the first display portion 602.

Illustrative Server System

Figure 7:
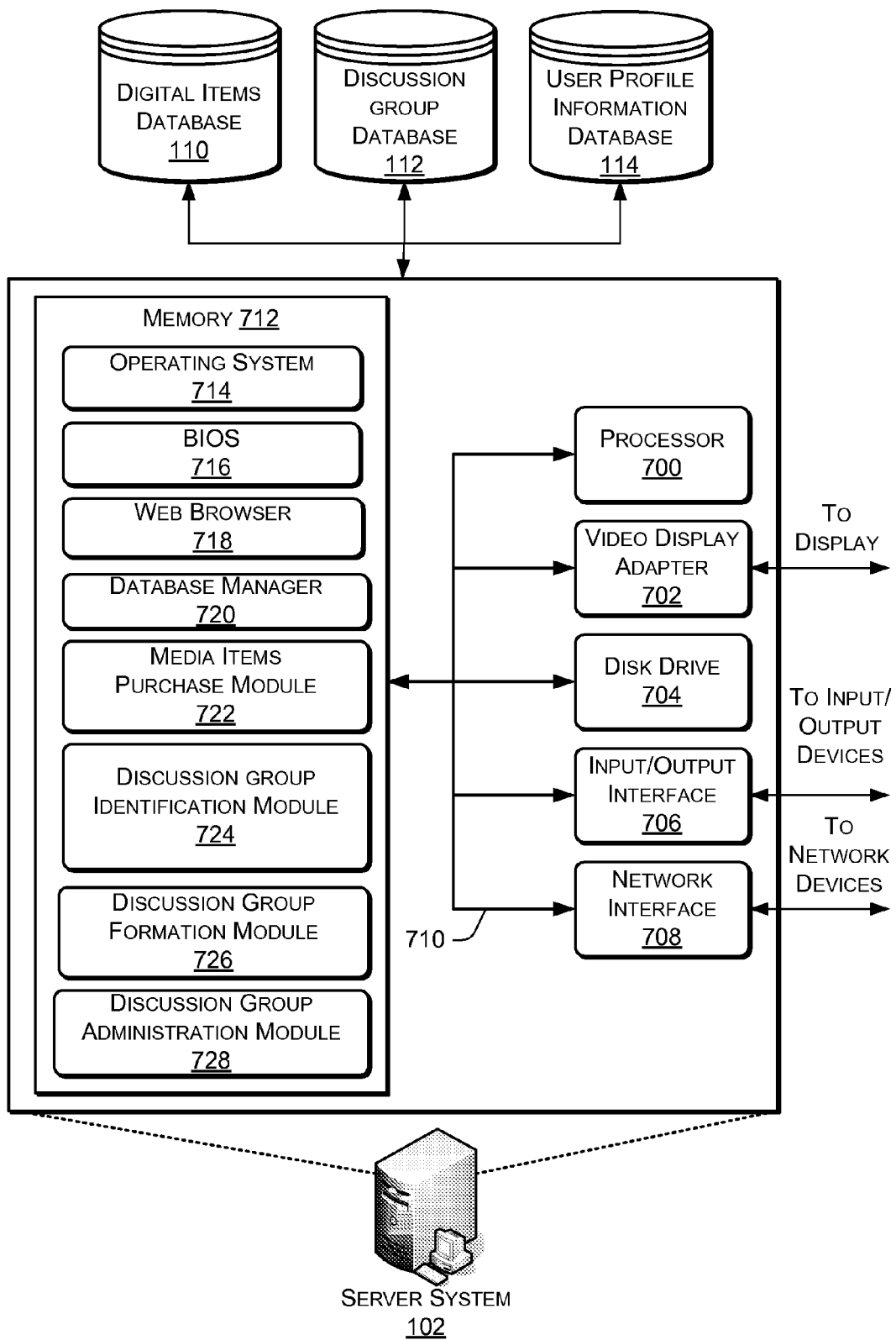
FIG. 7 is a pictorial diagram of an illustrative implementation of a server system that may be used in the computing environment of FIG. 1.

FIG. 7 is a schematic block diagram of an illustrative implementation of a server system, such as the server system 102, that may be used to facilitate discussion group formation and interaction. The server system 102 includes a processor 700, such as one or more redundant processors, a video display adapter 702, a disk drive 704, an input/output interface 706, a network interface 708, and a memory 712. The processor 700, the video display adapter 702, the disk drive 704, the input/output interface 706, the network interface 708, and the memory 712 may be communicatively coupled to each other by a communication bus 710.

The video display adapter 702 provides display signals to a local display (not shown in FIG. 7) permitting an operator of the server system 102 to monitor and configure operation of the server system 102. The input/output interface 706 likewise communicates with external input/output devices not shown in FIG. 7, such as a mouse, keyboard, scanner, or other input and output devices that can be operated by an operator of the server system 102. The network interface 708 includes hardware, software, or any combination thereof, to communicate with other computing devices. For example, the network interface 708 may be configured to provide communications between the server system 102 and other computing devices, such as the first client device 104 and the second client device 106, via the network 108, as shown in FIG. 1.

The memory 712 generally comprises random access memory (RAM), read-only memory (ROM), flash memory, and/or other volatile or permanent memory. The memory 712 is shown storing an operating system 714 for controlling the operation of the server system 102. A binary input/output system (BIOS) 716 for controlling the low-level operation of the server system 102 is also stored in the memory 712.

The memory 712 additionally stores program code and data for providing network services that allow client devices to exchange information and data files with the server system 102. Accordingly, the memory 712 may store a browser application 718. The browser application 718 comprises computer executable instructions, that, when executed by the processor 700 generate or otherwise obtain configurable markup documents such as Web pages. The browser application 718 communicates with a database manager application 720 to facilitate data exchange between the digital items database 110, the discussion group database 112, the user profile information database 114, or any combination thereof, and client devices, such as the first client device 104 and the second client device 106 shown in FIG. 1.

Additionally, the memory 712 includes a media items purchase module 722, a discussion group identification module 724, a discussion group formation module 726, and a discussion group administration module 728. The modules 722-728 may be executable by the processor 700 to implement one or more of the functions of the server system 102. In one embodiment, each of the modules 722-728 may represent instructions embodied in one or more software programs stored in the memory 712. In another embodiment, the modules 722-728 can represent hardware, software instructions, or a combination thereof.

In a particular embodiment, the media item purchase module 722 is configured to provide one or more user interfaces and conduct financial transactions involved with purchasing media items. In one example, the one or more user interfaces may include Website content. The media items may include physical items, such as books, compact discs, albums, digital video discs, blu-ray discs, and tickets to performances. The media items may also include digital items, electronic video content, such as downloadable movies and television programming, and electronic audio content, such as downloadable songs and albums. The media items may be offered for purchase by an online service associated with the server system 102. Alternatively, or additionally, the media items may be offered for purchase by individuals and/or businesses. In some instances, the individuals and/or businesses may offer media items for purchase via Website content provided by the online service.

In an illustrative embodiment, the media items purchase module 722 may provide a user interface to client devices, where the user interface specifies media items available for purchase. The media items purchase module 722 may receive purchase requests from client devices to purchase media items that are available for purchase via the user interface. After receiving a purchase request from a client device, the media items purchase module 722 may be configured to conduct a financial transaction for the purchase of the media item or media items that are specified in the purchase request. For example, the media items purchase module 722 may interact with a bank, another financial institution, a credit card company, a third party payment service, or a combination thereof, to exchange funds between an account of the purchaser and an account of the seller. In instances where digital items are purchased from the digital items database 110, the media items purchase module 722 may be configured to invoke a digital items module (not shown) to send the digital items from the digital items database 110 to the client device in response to receiving a request from a client device to download the digital items.

The discussion group identification module 724 may be invoked when a media item is purchased via the media items purchase module 722. After a media item has been purchased, the discussion group identification module 724 may determine whether the media item is associated with one or more discussion groups. For example, after the purchase of a book, the discussion group identification module 724 may determine whether there are any book clubs associated with the book. To illustrate, the discussion group identification module 724 may parse the discussion group database 112 to identify book clubs that are currently reading the purchased book, that include the purchased book on a reading list, that are associated with an author of the purchased book, that are associated with the same genre of the purchased book, or a combination thereof. When the media item is not associated with a discussion group, the discussion group identification module 724 may invoke the discussion group formation module 726 to send a message to the client device that includes an option to form a discussion group associated with the media item.

In some embodiments, when the media item is associated with one or more discussion groups, the discussion group identification module 724 may automatically send identifiers of one or more discussion groups associated with the media item to the client device. For example, the discussion group identification module 724 may provide identifiers of discussion groups associated with a purchased media item to the media items purchase module 720, such that the discussion group identifiers are presented to the purchaser of the media item on a user interface confirming the purchase of the media item. The user interface may also include an invitation to join one or more of the discussion groups or receive additional information associated with particular discussion groups. In other embodiments, when the media item is associated with one or more discussion groups, the discussion group identification module 724 may send user interface data to the client device relating to a user interface that provides a purchaser with an option to ask for discussion group recommendations associated with the media item, an option to search for discussion groups associated with the media item, or a combination thereof.

The discussion group identification module 724 may receive a discussion group recommendations request from a client device to receive recommendations for a discussion group associated with a purchased media item. After identifying one or more discussion groups associated with the media item, the discussion group identification module 724 may identify a subset of the one or more discussion groups to provide as recommendations to the requesting client device. The discussion group identification module 724 may determine the recommended discussion groups by comparing user profile information of the user purchasing the media item with user profile information of members of the discussion groups associated with the purchased media item. In this way, the recommended discussion groups may include members that are of a similar demographic to the media item purchaser, live in close proximity to the media item purchaser, have similar interests and/or background as the media item purchaser, or a combination thereof. The discussion group identification module 724 may rank the discussion groups according to how closely the user profile information of members of each discussion group match with the user profile information of the media item purchaser. The discussion group identification module 724 may send a specified number of the discussion groups with the highest rank to the client device in response to receiving the discussion group recommendations request. Further, the discussion group identification module 724 may provide the media item purchaser with the option of viewing additional discussion groups with lower rankings.

Additionally, the discussion group identification module 724 may receive a discussion group search request from a client device to identify discussion groups matching criteria specified by the discussion group search request. In response to receiving the discussion group search request, the discussion group identification module 724 may parse the discussion group database 112 and/or the user profile information database 114 to identify discussion groups matching the criteria specified in the discussion group search request. For example, the discussion group identification module 724 may search the discussion group database 112 and/or the user profile information database 114 to identify discussion groups associated with a particular media item, discussion groups including members having specified demographic characteristics, discussion groups including members having specified personal characteristics, discussion groups located in a particular geographic location, discussion groups having a particular emphasis, such as academic, or a combination thereof. After identifying one or more discussion groups matching the specified search criteria, the discussion group identification module 724 may send discussion group search results to the requesting client device. The discussion group search results may include information associated with the discussion groups matching the search criteria, such as identifiers of the discussion groups, links to Web pages including information relating to the discussion groups, a brief description of the discussion groups, or a combination thereof.

The discussion group formation module 726 may receive requests from client devices to join an existing discussion group. In some instances, the existing discussion group may be organized and/or sponsored by an online service associated with the server system 102. Additionally, the discussion group formation module 726 may receive requests from client devices to form a new discussion group. In some instances the discussion group may be associated with media items purchased via an online service provided by the server system 102. The discussion group formation module 726 may also send messages to client devices including an option to form a discussion group when a media item purchased via the server system 102 is not associated with any discussion group.

The discussion group formation module 726 may be configured to receive requests from client devices to send invitations to additional client device users to join a particular discussion group. For example, the discussion group formation module 726 may receive a request from a member of a discussion group to send an invitation to a member of a Friends and Family list to join the discussion group. Further, the discussion group formation module 726 may receive a request from a client device to search for potential book club members. To illustrate, the discussion group formation module 726 may receive a request from a client device to search the user profile information database 114 to identify users matching specified criteria or to identify users that have recently purchased a media item associated with the discussion group and to send an invitation to one or more of the identified users to join a particular discussion group. In an illustrative, non-limiting embodiment, the discussion group formation module 726 may be configured to send invitations to join discussion groups to users that have indicated an option in their user profile information to receive discussion group information and/or based on user privacy settings indicated in the user profile information. For example, a user privacy setting of "Low" may indicate that a particular user can receive invitations to join a discussion group, but a user privacy setting of "High" may indicate that a particular user does not want to receive unsolicited information.

The discussion group administration module 728 may be configured to identify discussion groups that are facilitated via the online service provided by the server system 102 and determine start times for meetings of the identified discussion groups. The discussion group administration module 728 may send reminder messages to members of the identified discussion groups indicating the start time of the next meeting of a respective discussion group. In some instances, the reminders may be sent periodically, at a specified time, or a combination thereof. The user profile information of a particular discussion group member may indicate the frequency for sending discussion group meeting reminder messages. The reminder message may be included in a text message, an email, an automated phone call, or a combination thereof. Additionally, the discussion group administration module 728 may receive participation messages from client devices in response to sending the reminder messages. The participation messages may indicate whether or not a respective user will be participating in a particular discussion group meeting.

Further, the discussion group administration module 728 may facilitate online discussion group meetings. For example, the discussion group administrative module 728 may provide user interfaces to discussion group members during an online meeting. The user interfaces may include features to post comments during the online meeting. An example of a user interface to post comments during an online meeting of a discussion group is shown in FIG. 5. As the discussion group administration module 728 receives comments from client devices of discussion group members, the discussion group administration module 728 may send updated user interfaces to the discussion group members that include the comments received. The discussion group administration module 728 may also provide one or more user interfaces and provide information to client devices of discussion group members to facilitate direct communication between discussion group members, such as via text message, email, and video conference. In one illustration, the discussion group administration module 728 may provide an IP address or phone number to a client device of a discussion group member attempting to communicate directly with a client device of another discussion group member.

Illustrative Client System

Figure 8:
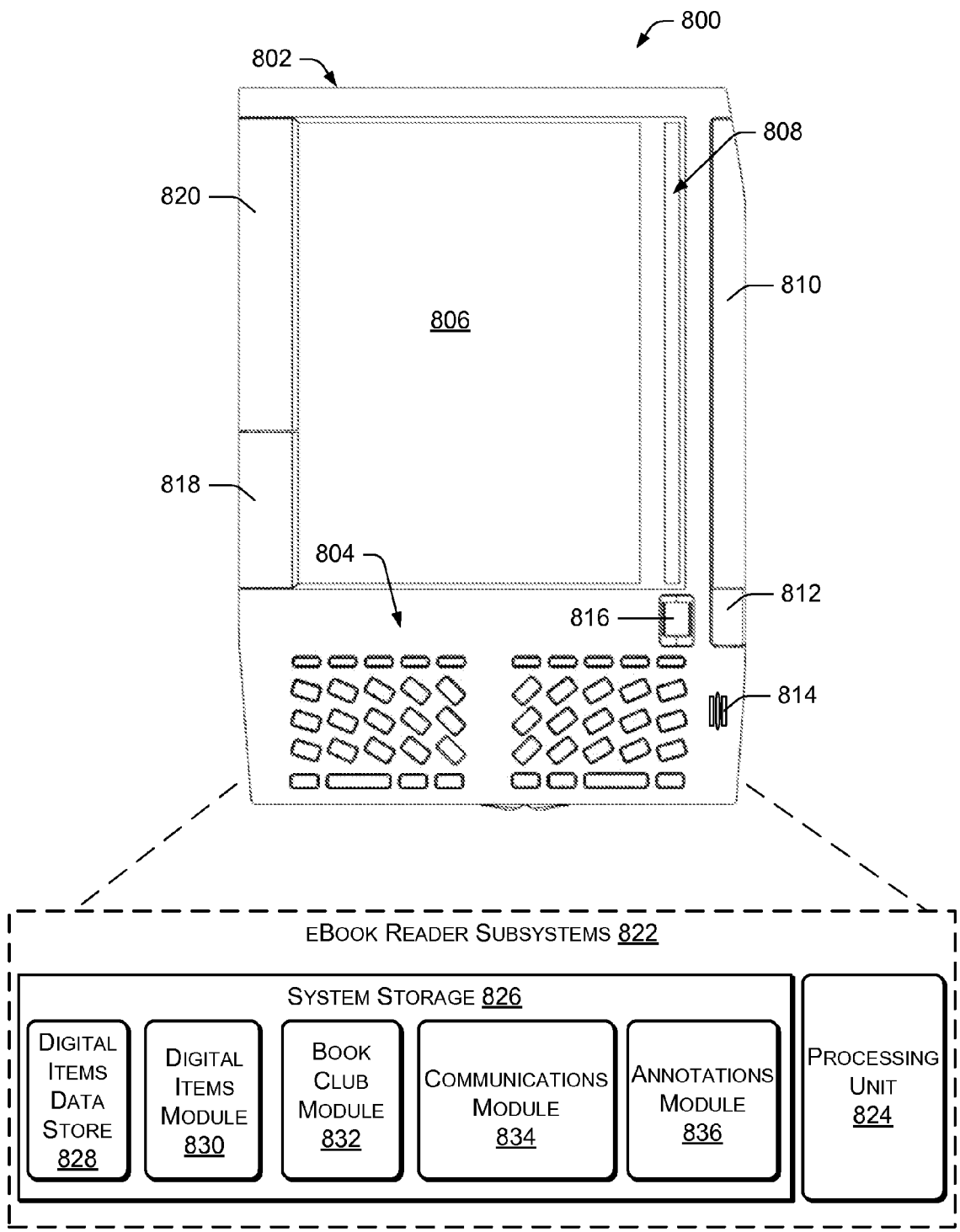
FIG. 8 is a pictorial diagram of an illustrative client device that may be used in the computing environment of FIG. 1.

FIG. 8 is a pictorial diagram of an illustrative client system in the form of an eBook reader device 800 that may be used with the computing environment of FIG. 1. However, virtually any other type of client device may be used to facilitate discussion group formation and interaction.

The eBook reader device 800 includes a body or housing 802, a keyboard 804, and a dual display system comprised of a first display 806 and a second display 808. The keyboard 804 includes a plurality of alphabetic, numeric, and/or function keys for entry of user input.

The first display 806 in the dual display system presents content in a human-readable format to the user. The content presented in the first display 806 may be digital items, such as electronic books, newspapers, or other readable or viewable materials. For example, the first display 806 provides the text of the electronic books and also depicts any illustrations, tables, or graphic elements that might be contained in the electronic books.

The second display 808 of the dual display system is a narrow screen located adjacent to the first display 806. The second display 808 is illustrated as being positioned to the right of the first display 806, although it may be located elsewhere in the housing 802 in other implementations. The second display 808 may be responsive to user input registered via, for example, a finger, a stylus, or other similar pointing device. Additionally, the second display 808 may enable presentation of graphic elements that correspond to content displayed in the first display 806.

The eBook reader device 800 may also include a variety of user input devices 810-820 to navigate through and among eBooks and digital items. Examples of user input devices 810-820 include buttons, scroll wheels, thumb wheels, thumb sticks, sensors that detect and register movement of a user's thumb or finger, tactile sensors, or any other conventional user input mechanism.

The eBook reader device 800 also has various internal components, which are referred to generally as eBook reader subsystems 822. In one implementation, the eBook reader subsystem 822 includes system storage 826 and a processing unit 824. The processing unit 824 interacts with the system storage 826 to facilitate operation of the eBook reader device 800. The system storage 814 may include volatile memory (such as RAM), nonvolatile memory, removable memory, and/or non-removable memory, implemented in any method or technology for storage of information, such as computer-readable instructions, data structures, program modules, or other data. Also, the processing unit 824 may include onboard memory in addition to or instead of the system storage 826. Some examples of storage media that may be included in the system storage 826 and/or processing unit 824 include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by the eBook reader device 800. Any such computer storage media may be part of the eBook reader device 800.

The system storage 826 may include a digital items data store 828 and modules 830-836. Further, the system storage 826 may store an application for browsing Web pages. The digital items data store 828 may include one or more digital items received from a server system, such as the server system 102 in FIG. 1 and FIG. 7. For example, the eBook reader device 800 may be configured to invoke the digital items module 830 to download electronic versions of books from a server system and store the data associated with the electronic versions of the books in the digital items data store 828. In some instances, the eBooks may be purchased utilizing the eBook reader device 800 via an online service provided by the server system.

The book club module 832 may be configured to facilitate participating in one or more book clubs associated with an eBook. In a particular embodiment, the book club module 832 is configured to receive book club information from a server system regarding an eBook stored in the digital items store 828. For example, the book club information received by the book club module 832 may include book club identifiers specifying book clubs associated with a particular eBook, Web addresses associated with the book clubs, a brief description of the book clubs, other book club information, or a combination thereof. In some embodiments, the book club module 832 may receive the book club information in response to downloading an eBook from a server system, such as the server system 102 of FIG. 1 and FIG. 7. The book club module 832 may be configured to provide a user interface via the first display 806 that includes the book club information.

Additionally, the book club module 832 may be configured to provide one or more user interfaces indicating an option to receive book club recommendations, an option to search for book clubs based on specified criteria, or a combination thereof. An example of a user interface including an option to receive book club recommendations and an option to search for book clubs based on specified criteria is shown in FIG. 2. Upon selection of the option to receive book club recommendations, the book club module 832 may send a corresponding book club recommendation request to a server system. Also, in response to selection of the option to search for book clubs based on specified criteria, the book club module 832 may be configured to provide a user interface including a number of fields to enter search criteria and to send a book club search request to a server system. An example of a user interface to enter search criteria of a book club search request is shown in FIG. 3. Further, the book club module 832 may receive book club recommendations and/or receive book club search results from the server system in response to sending a corresponding book club recommendations request or book club search request. The book club module 832 may provide a user interface including book club identifiers of the book club recommendations, the book club search results, or a combination thereof, to the first display 806. An example of a user interface having book club identifiers included in book club recommendations and/or book club search results is shown in FIG. 4.

The book club module 832 may be configured to provide one or more user interfaces including an option to form a book club, an option to search for other eBook reader device users that may be interested in joining a book club, an option to invite other eBook reader device users to join a particular book club, or a combination thereof. The book club module 832 may also be configured to receive reminder messages indicating a meeting time for a particular book club and generate participation messages in response to the reminder messages specifying whether or not a user of the eBook reader device 800 intends to participate in the book club meeting.

Further, the book club module 832 is configured to provide one or more user interfaces relating to participating in an online meeting of a book club. For example, the book club module 832 may provide user interfaces received from a server system to the first display 806 that include comments posted by members of a book club during a live online meeting of the book club. The one or more online meeting user interfaces provided by the book club module 832 may also be configured to post comments entered by a user of the eBook reader device 800 via the input devices 810-820. In addition, the online meeting user interfaces may include features that have options to directly communicate with other members of the discussion group via text message, email, chat, or video conference. An example of a user interface to display comments, to post comments, and including features facilitating direct communication with other book club members during an online meeting of a book club is shown in FIG. 5.

The book club module 832 may also be configured to provide user interfaces that include features to facilitate communication between book club members while a user of the eBook reader device 800 is viewing a particular eBook. For example, the book club module 832 may provide a user interface that includes a first portion having the text of a particular eBook. The user interface may also include a second portion listing one or more additional book club members and providing selectable options to communicate with another member of the book club via text message, chat, email, or video conference about the particular eBook while viewing the text of the particular eBook. An example of a user interface including text of an eBook, listing additional book club members, and providing options to communicate with another member of a book club while viewing the text of the eBook is shown in FIG. 6.

The communications module 834 is configured to facilitate communication between a user of the eBook reader device 800 and a user of another eBook reader device or another client device. The communications module 834 may receive information from a server system to enable communications between the eBook reader device 800 and another client device, such as an IP address or a telephone number. The communications module 834 may be configured to facilitate audio communications, video communications, text messaging, email, a chat session, or a combination thereof, between a user of the eBook reader device 800 and a user of another eBook reader device or client device.

In an illustrative embodiment, the communications module 834 may receive an indication that a user of the eBook reader device 800 has selected an option to communicate with a user of another client device. The communications module 834 may be configured to retrieve the IP address or telephone number and establish communications with the targeted client device. For example, a user of the eBook reader device 800 may select an option to send a text message to a user of another client device, such as a smart phone. In response to the selection of this option, the communications module 834 may launch an application that enables a user of the eBook reader device 800 to enter a text message. After the text message has been entered, the communications module 834 may be configured to retrieve an IP address associated with the targeted smart phone and establish a communication link with the smart phone via a wide area wireless data network. The communications module 834 may then send the text message to the smart phone of the specified book club member. Similarly, the communications module 834 may be configured to launch an email application, a chat application, or a video conference application and establish communication with a client device of a selected book club member upon selection of the respective communication option.

The communications module 834 may receive an indication that a user of the eBook reader device 800 has selected an option to communicate with a user of an additional client device while participating in a live online meeting of a book club, where the user of the eBook reader device 800 and the user of the additional client device are members of the same book club and both are participating in the live online meeting. Thus, a user of the eBook reader device 800 can communicate with the members of the book club via a first mode of communication, that is via a discussion board or a chat session, by posting comments during the live online meeting. In addition, the user of the eBook reader device 800 can communicate directly with a specified member of the book club via a second mode of communication, such as email, text message, or chat session, while continuing to participate in the live online meeting.

The eBook reader device 800 may include a network interface that enables communication with other computing devices such as the server system 102 of FIG. 1 and FIG. 7, with another client device, or a combination thereof. Wired or wireless network connections may be used with any suitable communication protocol, such as TCP/IP.

The annotations module 836 may be configured to provide an annotations user interface to enter annotations related to a digital item being viewed via the eBook reader device 800. The annotations module 836 may also be configured to provide a user of the eBook reader device 800 with the option of sending the annotation to be stored at a remote data store accessible to a server system, such as the server system 102 of FIG. 1 and FIG. 7, where the annotation may be accessible to other book club members. In addition, the annotations module 836 may provide a user of the eBook reader device 800 with the option of storing an annotation locally at an annotations data store (not shown). Further, the annotations module 836 may be configured to generate an annotations request and send the annotations request to a server system to retrieve annotations submitted by other members of a book club. In some embodiments, annotations may be shared between members of other groups, such as educational classes.

Annotations may be received in a visual form, in an audio form, or a combination thereof. For example, annotations may be expressed via handwriting, text, formatting, such as highlighting, an attachment of image files, an attachment of audio files, or a combination thereof. Annotations may be words, graphs, formulae, files, images, enhancements, etc., provided by a commentator. By way of illustration, an annotation can also be in the form of a link or address to another page, file, or document available to the server system 102 or eBook reader device 800. There is virtually no limitation to the type, form and content of annotations that can be added to a digital item.

Furthermore, visual indicators may be included in a digital item to identify particular content having annotations. In a textual digital item for example, the indicators may appear as footnotes, graphical icons, symbols, characters, or other indicia that are located with the text. In yet another alternative, a digital item having annotations pertaining to particular content in the digital item may provide a listing of contents for the digital item with indicators in the listing of contents identifying the location of the annotations.

Illustrative Methods

Figure 9:
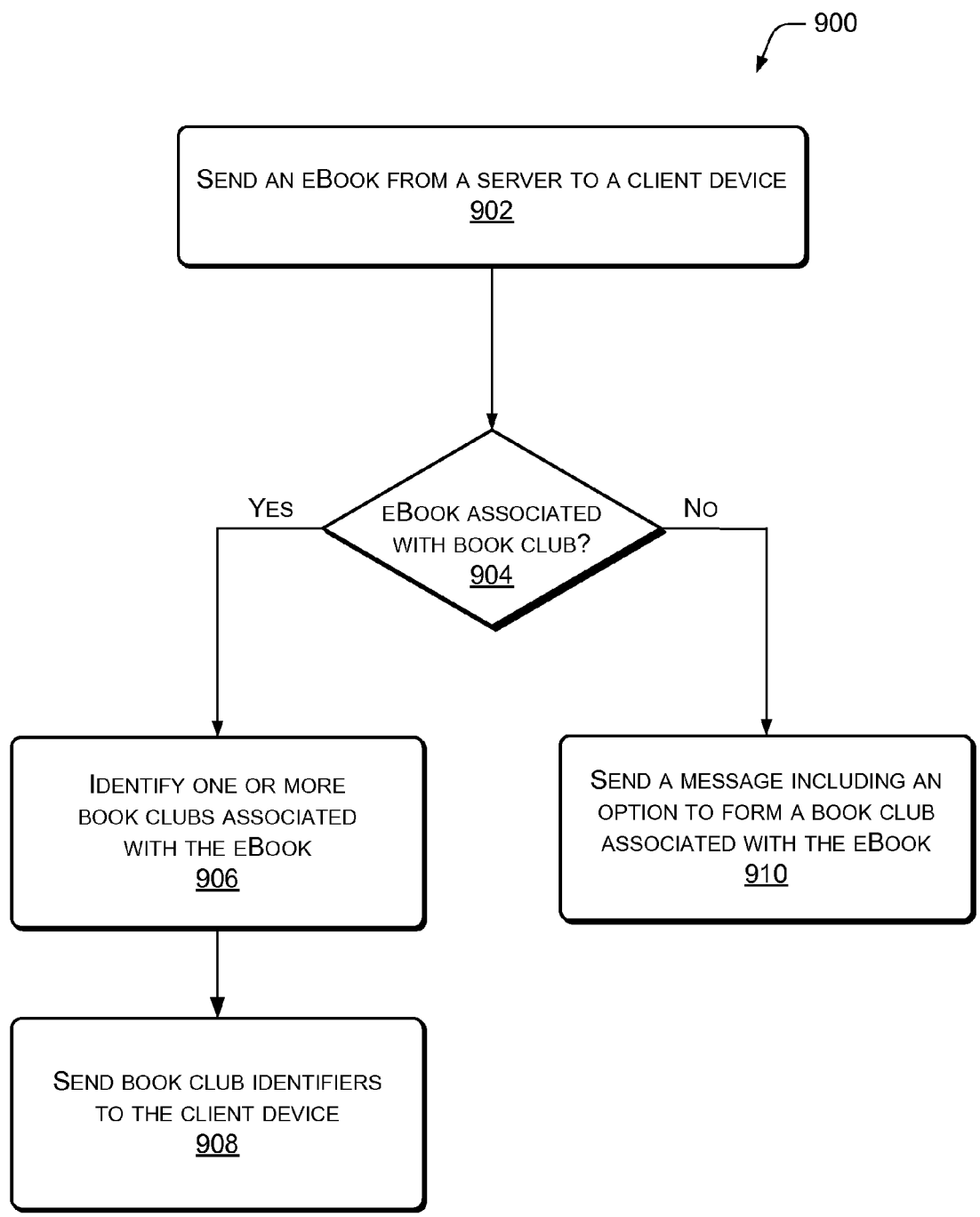
FIG. 9 is a flow diagram of an illustrative method of providing book club identifiers to a client device when an eBook downloaded to the client device is associated with a book club and providing an option to form a book club when the eBook downloaded to the client device is not associated with a book club.
Figure 10:
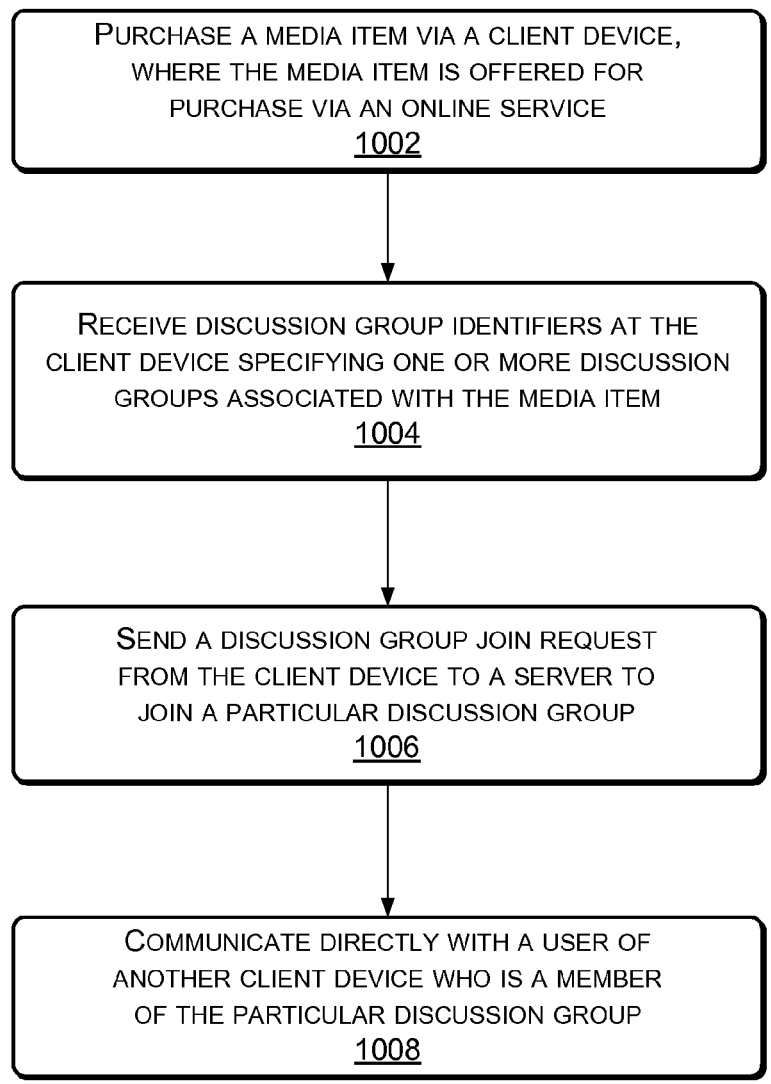
FIG. 10 is a flow diagram of an illustrative method of facilitating formation of a discussion group associated with a media item purchased via an online service and communicating with other members of the discussion group utilizing a client device.
Figure 11:
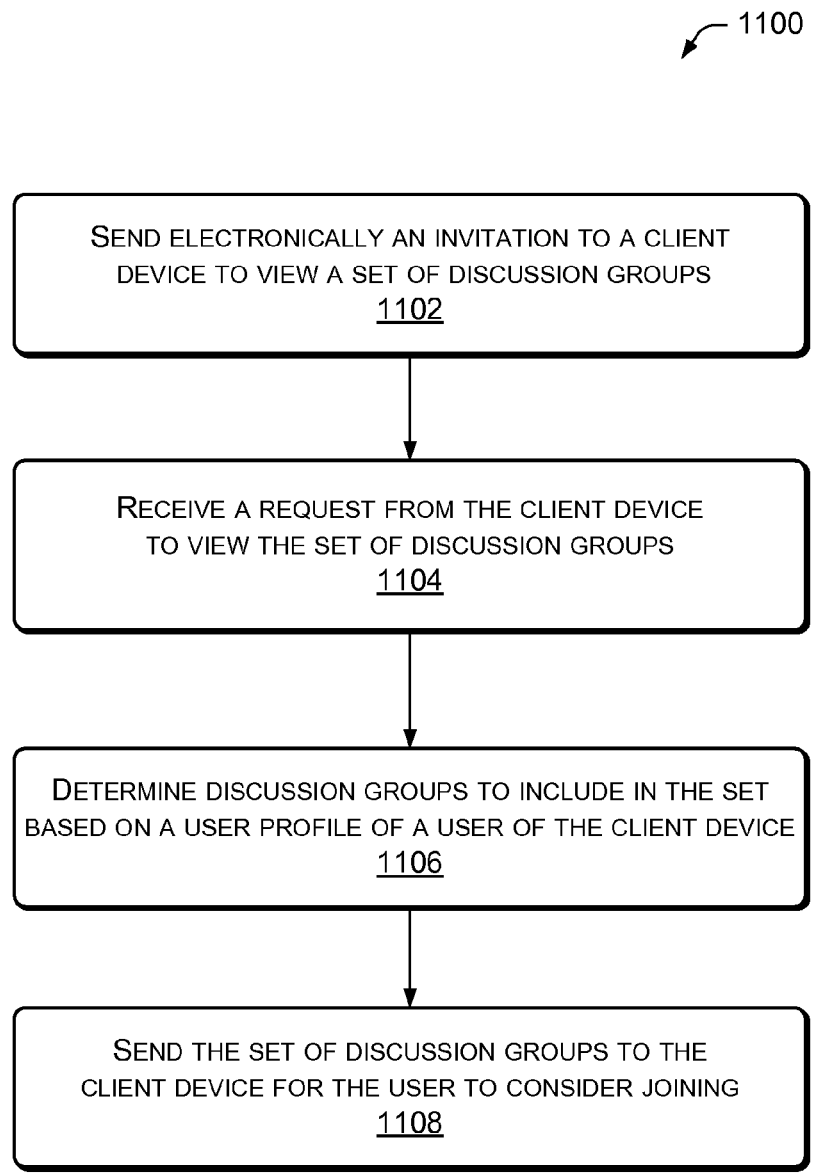
FIG. 11 is a flow diagram of an illustrative method of sending discussion group recommendations to a user of a client device in response to receiving a discussion group recommendations request from the client device.

FIGS. 9-11 include flow diagrams of illustrative methods of facilitating discussion group formation and interaction. The methods of FIGS. 9-11 may, but need not necessarily, be implemented using the server system 102, one or more of the client devices 104 and 106, and/or the eBook reader device 800 shown in FIG. 1 and FIGS. 7-8.

FIG. 9 is a flow diagram of an illustrative method 900 of providing book club identifiers to a client device when an eBook downloaded to the client device is associated with a book club and providing an option to form a book club when the eBook downloaded to the client device is not associated with a book club. In this particular implementation, the method 900 begins at block 902 with sending an eBook from a server to a client device. The server may send the eBook to the client device in response to a user of the client device purchasing a copy of the eBook. Proceeding to decision 904, the server determines whether the eBook is associated with a book club. The eBook may be associated with a book club when the eBook is included in a list of books being read by members of the book club, when the eBook is currently being read by one or more members of a book club, when the eBook has an author that is common to books that are being read by members of a book club, when the eBook is of a similar genre to books that are being read by members of a book club, or a combination thereof.

When the eBook is associated with a book club, the method advances to 906 where the server identifies one or more book clubs associated with the eBook. In an illustrative embodiment, the one or more book clubs identified represent a subset of the book clubs associated with the eBook. For example, the server may identify the one or more book clubs associated with the eBook based on user profile information of the user of the client device. To illustrate, the server may compare user profile information of the user of the client device with information of a plurality of additional user profiles to identify one or more book clubs associated with the eBook that are most relevant to the user of the client device. The server may identify the one or more book clubs associated with the eBook in response to receiving a book club recommendations request or a book club search request from the client device. The method moves to 908 where the server sends book club identifiers of the one or more book clubs to the client device.

When the eBook is not associated with a book club, the method proceeds to 910 where the server sends a message to the client device including an option to form a book club associated with the eBook. In a particular embodiment, when the user of the client device decides to form the book club, the client device user may send invitations to additional client device users to join the book club via the server. In some instances, the server may provide an online service with a number of registered users that buy and sell products via the online service. The server may track the purchases and sales made by each registered user. Thus, the client device may submit a request to the server to search for other users of the online service that have purchased or downloaded the eBook. The client device may receive user identifiers from the server specifying additional client device users that have downloaded the eBook and the client device user may subsequently select one or more of the identifiers and send invitations to the corresponding additional client device users join the book club via the server.

FIG. 10 is a flow diagram of an illustrative method 1000 of facilitating formation of one or more discussion groups associated with a media item purchased via an online service and communicating with other members of a particular discussion group utilizing a client device. The method 1000 begins at 1002 with the purchase of a media item via a client device, where the media item is offered for sale via an online service, such as a Website of an online retailer. The media item may include a physical product, such as a book, album, compact disc, digital video disc, or blu-ray disc, or the media item may include a digital item, such as an eBook, an electronic version of a song, an electronic version of an album, an electronic version of a movie, or an electronic version of television programming. The discussion group may meet in a physical location, online, or a combination thereof.

Proceeding to 1004, discussion group identifiers are received at the client device from a server in response to purchasing the media item. The discussion group identifiers specify one or more discussion groups associated with the media item. In an illustrative, non-limiting embodiment, the one or more discussion groups may be located within a geographic location associated with a user of the client device. The geographic location of the user of the client device and the geographic location of other discussion group members may be determined based on user profile information, wide area wireless network information, geographic position system (GPS) information, or a combination thereof.

Advancing to 1006, a discussion group join request is sent from the client device to the server to join a particular discussion group of the one or more discussion groups specified by the discussion group identifiers. Moving to 1008, the user of the client device communicates directly with a user of another client device who is a member of a particular discussion group. In one example, the client device users may directly communicate during a live online meeting of the discussion group. To illustrate, the client device users may exchange text messages or emails while still participating in a meeting that includes additional members of the discussion group. In another example, the client device users may directly communicate outside of a discussion group meeting. In one illustration, client device users may exchange text messages or emails while viewing a book or listening to an audio work associated with the discussion group.

FIG. 11 is a flow diagram of an illustrative method 1100 of sending a book club recommendation to a user of a client device. The method 1100 begins at 1102 by sending electronically an invitation to a client device to view a set of discussion groups. For example, a server may provide a user interface to a client device, where the user interface includes an option for a user of the client device to receive recommendations for a discussion group. The server may provide the user interface to the client device after a user of the client device purchases a media item via an online service provided by the server. Moving to 1104, the server receives a request from the client device to view the set of discussion groups. To illustrate, the client device may send a discussion group recommendations request to identify discussion groups associated with a particular media item.

Proceeding to 1106, the server determines discussion groups to include in the set based on a user profile of a user of the client device. In an illustrative embodiment, the server compares user profile information of the user of the client device with user profile information of members of a number of discussion groups to identify the set of discussion groups. Advancing to 1108, the server sends the set of discussion groups to the client device. The set of discussion groups may be recommended discussion groups for the user to consider joining. In one example, the server sends a user interface to the client device that includes respective identifiers of the set of discussion groups.

While several implementations have been illustrated and described above, it will be appreciated that various changes can be made therein and that the scope of the implementations should be determined from the following claims and equivalents thereto.

Certain drawings illustrate features by showing various logic, modules, components, functionality, and so forth. The terms "logic," "module," "component," "functionality" and the like generally represent hardware, software, firmware, or any combination of these elements, or yet some other kind of implementation. The term "computer-readable media" refers to any kind of media capable of retaining information in any form readable by a computer or other machine, including various kinds of storage devices (magnetic, optical, static, etc.). Various instructions, methods and techniques described herein may be considered in the general context of computer-readable storage media including computer-executable instructions, such as program modules, executed by one or more computers or other devices. The computer-executable instructions include routines, programs, objects, components, data structures, etc. for performing particular tasks or implementing particular abstract data types. The computer-executable instructions may be executed as native code or may be downloaded and executed, such as in a virtual machine or other just-in-time compilation execution environment. Typically, the functionality of the computer-executable instructions may be combined or distributed as desired in various implementations.

Other figures illustrate features in signal diagram form and/or flowchart form. In this mode of explanation, certain operations are described as constituting distinct tasks performed in a certain order. Such implementations are illustrative and non-limiting. Separate operations described in these figures may be grouped together and performed in a single operation, while certain single operations may be performed in multiple parts. Certain operations may be performed in an order different from the order illustrated in the figures. Certain operations may be performed by different agents than those identified in the figures. The operations shown in the figures may be implemented by software, firmware, hardware, manual processing, or other form, or by any combination of these forms.

In general, the various features described in the implementations may be regarded as optional features, meaning that these features may be omitted or replaced with other features. Further, the various implementations described herein may be supplemented by adding additional features.

What is claimed is:

1. A method comprising:
   sending an electronic book (eBook) from a server to a client device;
   determining, at the server, whether the eBook is associated with at least one book club in response to sending the eBook to the client device;
   comparing user profile information of a user of the client device with information of a plurality of additional user profiles to identify one or more book clubs associated with the eBook to recommend to the user of the client device when the eBook is associated with at least one book club, wherein the plurality of additional user profiles are associated with respective members of the one or more book clubs and the user of the client device is not a member of the one or more book clubs;
   sending book club identifiers from the server to the client device, the book club identifiers specifying the one or more book clubs associated with the eBook.

2. The method of claim 1, further comprising sending a message including an option to form a book club associated with the eBook from the server to the client device when the eBook is not associated with at least one book club.

3. The method of claim 1, wherein the user profile information includes demographic information, interests, hobbies, previous eBooks downloaded, occupation, educational level, geographic location, location of residence, discussion group memberships, additional personal information, or a combination thereof.

4. The method of claim 1, further comprising receiving a book club formation request at the server from the client device, the book club formation request to form a particular book club associated with the eBook.

5. The method of claim 4, further comprising sending user identifiers to the client device from the server, wherein the user identifiers specify additional client device users that have downloaded the eBook.

6. The method of claim 5, further comprising receiving a request at the server from the client device to send an invitation to at least one of the additional client device users to join the particular book club associated with the eBook.

7. The method of claim 1, further comprising receiving a discussion group join request from the client device for the user of the client device to join a particular discussion group of the one or more discussion groups.

8. An electronic book (eBook) reader device comprising:
   a digital items data store including data associated with a number of eBooks;
   a processing unit;
   a system storage accessible to the processing unit, the system storage including:
      a digital items module to download an eBook from a server and store the eBook in the digital items data store; and
      a book club module to facilitate participating in one or more book clubs that are associated with the eBook; and
   a communications module accessible to the processing unit, the communications module is configured to:
      facilitate communications between the eBook reader device and a number of additional eBook reader devices associated with members of a particular book club via a first mode of communication; and
      facilitate direct communications between the eBook reader device and an eBook reader device of a specified member of the particular book club via a second mode of communication while the eBook reader device is communicating with the number of additional eBook reader devices via the first mode of communication, the second mode of communication being different from the first mode of communication.

9. The eBook reader device of claim 8, wherein the communications module is configured to facilitate audio communication, video communication, text messaging, email, a chat session, or a combination thereof, with the users of the additional eBook reader devices.

10. The eBook reader device of claim 8, wherein the system storage includes an annotations module to enter an annotation with respect to a portion of the eBook.

11. The eBook reader device of claim 8, wherein the book club module is configured to provide one or more user interfaces to participate in a live online meeting of the particular book club.

12. A system comprising:
a processor; and
memory accessible to the processor, the memory including:
  a digital items module to send an electronic book to a client device; and
  a discussion group identification module to:
    compare user profile information of a user of the client device with a plurality of additional user profiles of members of one or more discussion groups associated with the electronic book in response to sending the electronic book to the client device, wherein the user of the client device is not a member of the one or more discussion groups;
    identify at least one discussion group of the one or more discussion groups associated with the electronic book to recommend to a user of the client device based, at least in part, on comparing the user profile information of the user of the client device with the plurality of additional user profiles of members of the one or more discussion groups associated with the electronic book; and
    send a respective book club identifier to the client device specifying the at least one discussion group of the one or more discussion groups associated with the electronic book.

13. The system of claim 12, wherein the discussion group identification module identifies the one or more discussion groups associated with the electronic book by parsing a discussion group database to identify book clubs that are currently reading the electronic book, that include the electronic book on a reading list, that are associated with an author of the electronic book, that are associated with a genre of the electronic book, or a combination thereof.

14. The system of claim 12, wherein the discussion group identification module is configured to rank the one or more discussion groups associated with the electronic book according to how closely user profile information of members of each respective discussion group match user profile information of the user of the client device.

15. The system of claim 12, further comprising a discussion group formation module to send a message to the client device that includes an option to form a discussion group associated with the electronic book.

16. The system of claim 15, wherein the discussion group formation module is configured to receive a request to search for potential members of the discussion group.

17. The system of claim 16, wherein the discussion group formation module is configured to identify the potential members of the discussion group by searching a user profile information database to identify users matching specified criteria.

18. The system of claim 16, wherein the discussion group formation module is configured to identify the potential members of the discussion group by identifying users that have recently purchased the electronic book.

19. The system of claim 12, wherein the discussion group meets in a physical location.

20. The system of claim 12, wherein the discussion group meets online.

* * * * *